United States Patent
Yamahara

(10) Patent No.: US 9,813,410 B2
(45) Date of Patent: Nov. 7, 2017

(54) INFORMATION PROCESSING APPARATUS, INFORMATION PROCESSING METHOD, AND INFORMATION PROCESSING PROGRAM

(71) Applicant: Rakuten, Inc., Tokyo (JP)

(72) Inventor: Hisanori Yamahara, Tokyo (JP)

(73) Assignee: Rakuten, Inc., Tokyo (JP)

( * ) Notice: Subject to any disclaimer, the term of this patent is extended or adjusted under 35 U.S.C. 154(b) by 167 days.

(21) Appl. No.: 14/769,518

(22) PCT Filed: Jun. 26, 2014

(86) PCT No.: PCT/JP2014/066993
§ 371 (c)(1),
(2) Date: Aug. 21, 2015

(87) PCT Pub. No.: WO2015/198451
PCT Pub. Date: Dec. 30, 2015

(65) Prior Publication Data
US 2016/0294804 A1    Oct. 6, 2016

(51) Int. Cl.
*H04L 29/06* (2006.01)

(52) U.S. Cl.
CPC .......... *H04L 63/083* (2013.01); *H04L 63/102* (2013.01); *G06F 2221/2113* (2013.01); *G06F 2221/2139* (2013.01)

(58) Field of Classification Search
CPC .............. H04L 63/083; H04L 63/102; G06F 2221/2113; G06F 2221/2139; G06F 2221/2111
See application file for complete search history.

(56) References Cited

U.S. PATENT DOCUMENTS

| | | | | |
|---|---|---|---|---|
| 7,438,226 | B2 * | 10/2008 | Helsper | G06Q 30/06 235/375 |
| 7,708,200 | B2 * | 5/2010 | Helsper | G06Q 30/06 235/380 |
| 8,504,831 | B2 * | 8/2013 | Pratt | G06F 21/40 713/150 |

(Continued)

FOREIGN PATENT DOCUMENTS

| | | |
|---|---|---|
| JP | 2004-118456 A | 4/2004 |
| JP | 2008-40984 A | 2/2008 |
| JP | 2009-187183 A | 8/2009 |

OTHER PUBLICATIONS

Yahoo! Inc., "Sign into Yahoo", [online], [searched on May 28, 2014], Internet <URL: https://login.yahoo.com/config/login? .src=fpctx&intl=us&.done-https%3A%2F%2Fwww.yahoo.com%2F>.

*Primary Examiner* — Sharon Lynch
(74) *Attorney, Agent, or Firm* — Sughrue Mion, PLLC

(57) ABSTRACT

It is an object to allow for simplification of authentication information to be input by a user while ensuring security. An information processing apparatus identifies a current situation in which a user is placed. The information processing apparatus obtains a past situation in which the user was placed at the time of past authentication. When the user is currently authenticated, the information processing apparatus simplifies authentication information to be entered by the user, depending on the current and past situations. The information processing apparatus outputs information prompting for the simplified authentication information.

16 Claims, 27 Drawing Sheets

(56) References Cited

U.S. PATENT DOCUMENTS

| | | | | |
|---|---|---|---|---|
| 8,869,305 B1* | 10/2014 | Huang | G06F 21/604 | 380/258 |
| 9,253,198 B2* | 2/2016 | Hughes, Jr. | H04L 63/105 | |
| 9,622,077 B2* | 4/2017 | Hughes | H04L 63/105 | |
| 2003/0105971 A1* | 6/2003 | Angelo | G06F 21/31 | 726/5 |
| 2005/0097320 A1* | 5/2005 | Golan | G06F 21/40 | 713/166 |
| 2006/0149580 A1* | 7/2006 | Helsper | G06Q 30/06 | 235/383 |
| 2006/0282285 A1* | 12/2006 | Helsper | G06Q 30/06 | 709/238 |
| 2006/0282660 A1* | 12/2006 | Varghese | G06Q 20/341 | 713/155 |
| 2006/0287902 A1* | 12/2006 | Helsper | G06Q 30/06 | 235/382 |
| 2007/0288748 A1* | 12/2007 | Kakiuchi | G06F 21/316 | 713/159 |
| 2010/0175116 A1* | 7/2010 | Gum | G06F 21/31 | 726/6 |
| 2010/0245042 A1* | 9/2010 | Tsubaki | G06F 21/32 | 340/5.82 |
| 2011/0225625 A1* | 9/2011 | Wolfson | H04L 63/08 | 726/1 |
| 2013/0036462 A1* | 2/2013 | Krishnamurthi | G06F 21/32 | 726/19 |
| 2013/0055370 A1* | 2/2013 | Goldberg | G06F 21/31 | 726/7 |
| 2013/0318596 A1* | 11/2013 | Huang | G06F 21/46 | 726/18 |
| 2014/0289528 A1* | 9/2014 | Baghdasaryan | G06Q 20/42 | 713/171 |
| 2014/0289790 A1* | 9/2014 | Wilson | G06Q 20/42 | 726/1 |
| 2014/0289808 A1* | 9/2014 | Blanke | G06Q 20/42 | 726/4 |
| 2014/0289819 A1* | 9/2014 | Lindemann | G06Q 20/42 | 726/5 |
| 2014/0289820 A1* | 9/2014 | Lindemann | G06Q 20/42 | 726/5 |
| 2014/0289821 A1* | 9/2014 | Wilson | G06Q 20/42 | 726/5 |
| 2014/0289822 A1* | 9/2014 | Wilson | G06Q 20/42 | 726/5 |
| 2015/0058941 A1* | 2/2015 | Lyman | H04L 63/08 | 726/6 |
| 2015/0121464 A1* | 4/2015 | Hughes, Jr. | H04L 63/105 | 726/4 |
| 2016/0036799 A1* | 2/2016 | Lyman | H04L 63/08 | 726/7 |
| 2016/0073261 A1* | 3/2016 | Hughes, Jr. | H04L 63/105 | 455/411 |

* cited by examiner

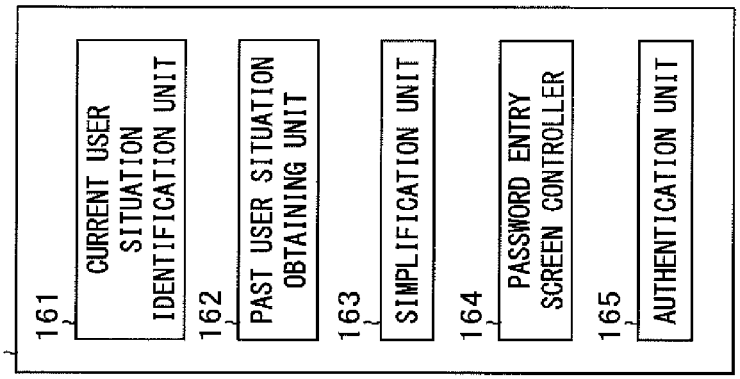
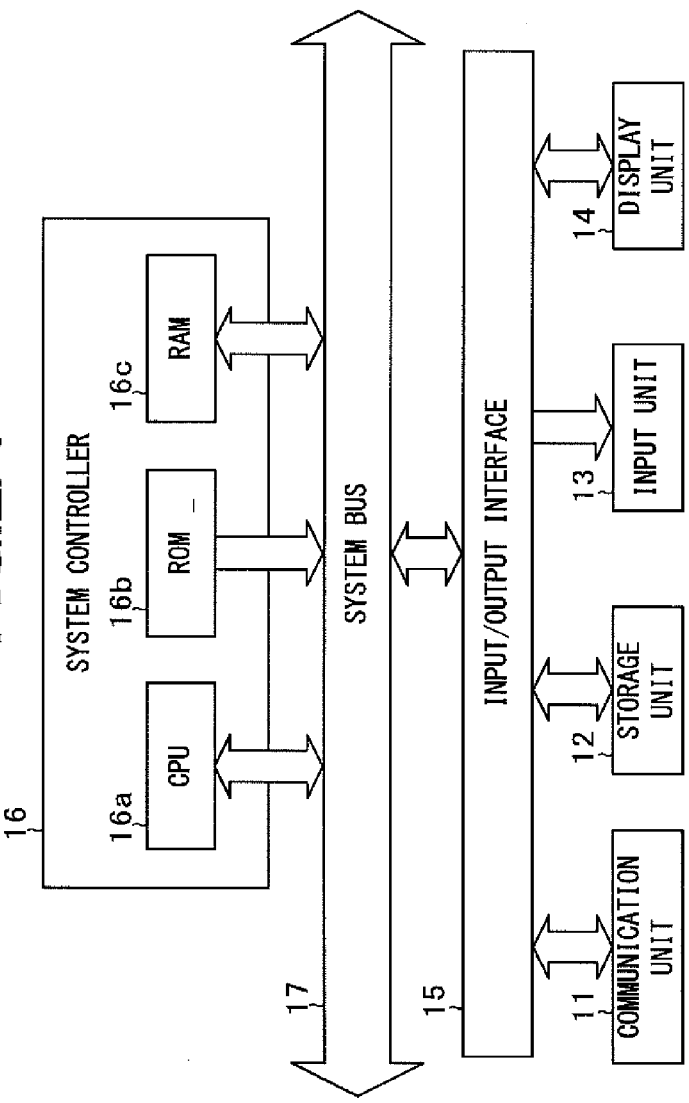

FIG.3A

| SITUATIONS | AGREE | DISAGREE |
|---|---|---|
| SECURITY | HIGH | LOW |
| SIMPLICITY | 2 | 1 |

FIG.3B

| SECURITY | HIGH | ⟷ | LOW |
|---|---|---|---|
| THE NUMBER OF VARIATIONS IN CHARACTER TYPES | FEW | ⟷ | MANY |

FIG.3C

| REGISTERED PASSWORD | SECURITY | |
|---|---|---|
| | HIGH | LOW |
| | SIMPLIFIED PASSWORD | |
| q3nifa83e | 383 | qni |

FIG.3D

| SECURITY | HIGH | ⟷ | LOW |
|---|---|---|---|
| THE NUMBER OF CHARACTER TYPES | FEW | ⟷ | MANY |

FIG.3E

| REGISTERED PASSWORD | SECURITY | |
|---|---|---|
| | HIGH | LOW |
| | SIMPLIFIED PASSWORD | |
| q3nifa83e | nifa | a83e |

FIG.3F

| SECURITY | HIGH | ⟷ | LOW |
|---|---|---|---|
| THE NUMBER OF CHARACTERS | FEW | ⟷ | MANY |

FIG.3G

| REGISTERED PASSWORD | SECURITY | |
|---|---|---|
| | HIGH | LOW |
| | SIMPLIFIED PASSWORD | |
| q3nifa83e | q3n | q3ni |

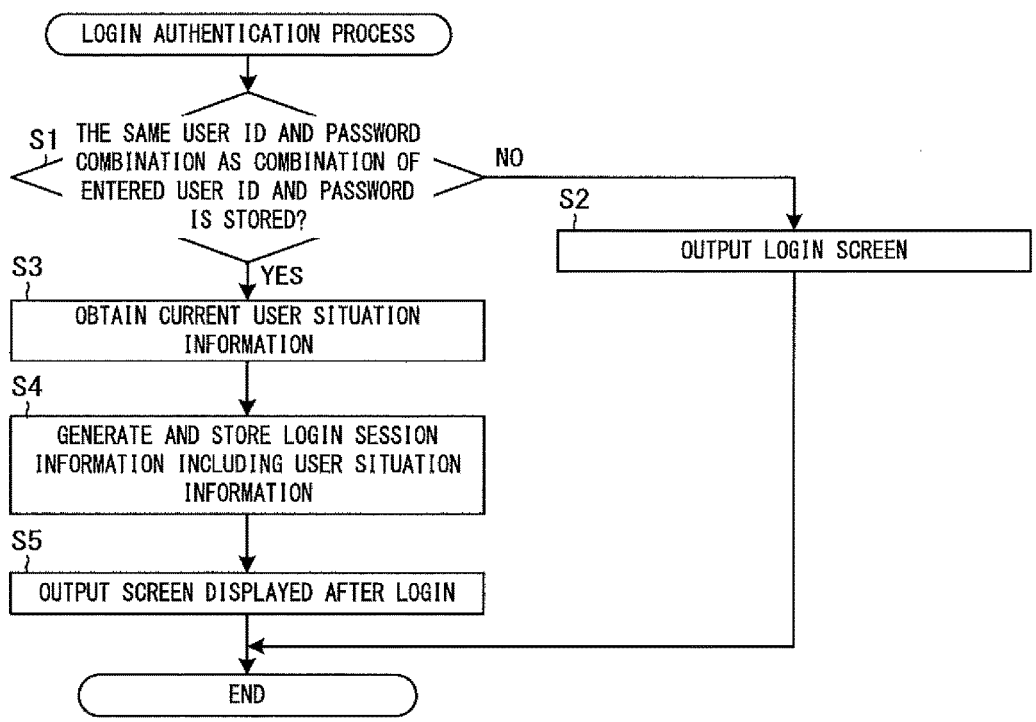

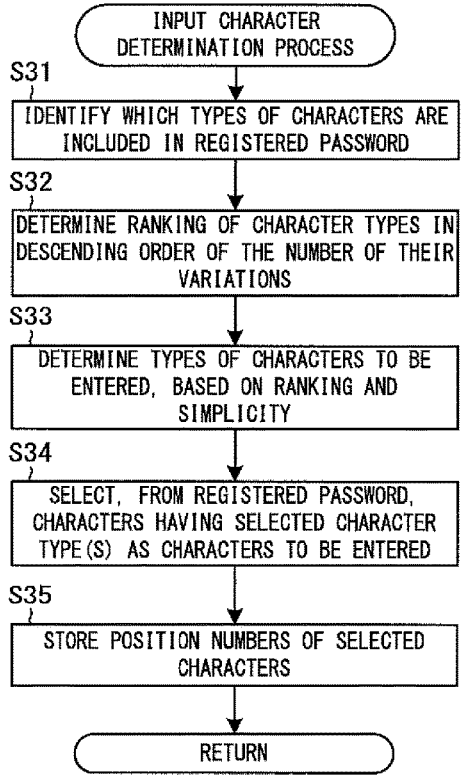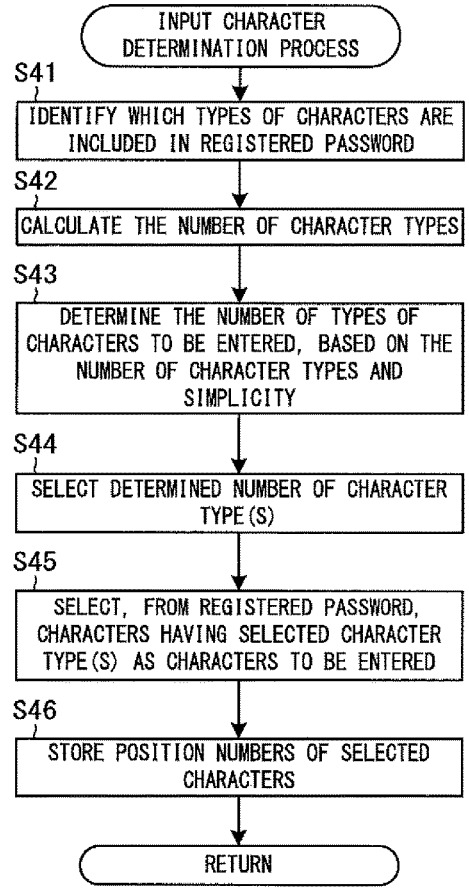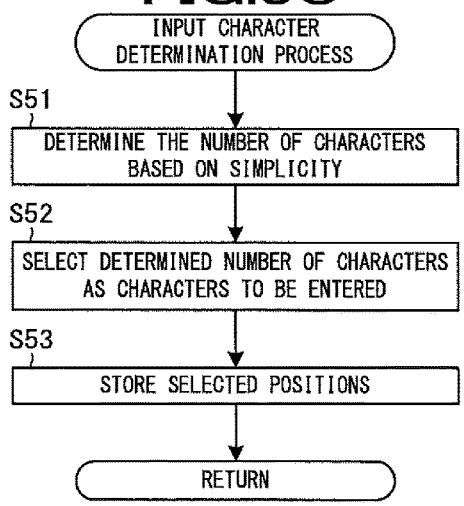

FIG.11

| SITUATIONS | AGREE | | | | | DISAGREE |
|---|---|---|---|---|---|---|
| AGREEMENT COUNT | 1 | 2 | 3 | 4 | 5 or more | — |
| SIMPLICITY | 6 | 5 | 4 | 3 | 2 | 1 |

FIG.14

| SITUATIONS | AGREE | DISAGREE | | | | |
|---|---|---|---|---|---|---|
| SITUATION DIFFERENCE | 0 | 1 | 2 | 3 | 4 | 5 or more |
| SIMPLICITY | 6 | 5 | 4 | 3 | 2 | 1 |

FIG.16A

SITUATIONS DISAGREE FOR THE FIRST TIME

| SITUATION DIFFERENCE | 1-4 | 5-8 | 9-12 | 13-16 | 17 or more |
|---|---|---|---|---|---|
| SIMPLICITY | 5 | 4 | 3 | 2 | 1 |

FIG.16B

SITUATIONS DISAGREE TWICE IN A ROW

| SITUATION DIFFERENCE | 1-2 | 3-4 | 5-6 | 7-8 | 9 or more |
|---|---|---|---|---|---|
| SIMPLICITY | 5 | 4 | 3 | 2 | 1 |

FIG.16C

SITUATIONS DISAGREE THREE TIMES IN A ROW

| SITUATION DIFFERENCE | 1 | 2 | 3 | 4 | 5 or more |
|---|---|---|---|---|---|
| SIMPLICITY | 5 | 4 | 3 | 2 | 1 |

INFORMATION PROCESSING APPARATUS, INFORMATION PROCESSING METHOD, AND INFORMATION PROCESSING PROGRAM

CROSS REFERENCE TO RELATED APPLICATIONS

This application is a National Stage of International Application No. PCT/JP2014/066993 filed Jun. 26, 2014, the contents of all of which are incorporated herein by reference in their entirety.

TECHNICAL FIELD

The present invention relates to a field of technology for receiving authentication information input by a user and used for authentication of the user.

BACKGROUND ART

Conventionally, authentication of a user is often performed for the user to use services, functions, or the like. The user inputs authentication information for the authentication. Examples of the authentication information include a password (e.g., Non-Patent Literature 1) and biometric information. The user is prompted to input such authentication information, for example, when the user uses a service for the first time. After that, for example, the user may not be prompted to input the authentication information for a limited period, or may be prompted to input the authentication information again when the user uses a specific service in the service in use.

CITATION LIST

Non-Patent Literature

Non-Patent Literature 1: Yahoo! Inc., "Sign in to Yahoo", [online], [searched on May 28, 2014], Internet <URL: https://login.yahoo.com/config/login?.src=fpctx&.intl=us&.done=https%3A %2F %2Fwww.yahoo.com %2F>

SUMMARY OF INVENTION

Technical Problem

However, it can be troublesome for the user to reinput the whole authentication information every time the user uses a specific service or function. Omitting the entry of the authentication information may be an option, but this is undesirable in terms of security.

In view of the above point, it is an object of the present invention to provide an information processing apparatus, an information processing method, and an information processing program that can simplify authentication information to be input by a user while ensuring security.

Solution to Problem

The invention according to claim 1 is 1. An information processing apparatus comprising: an identifying means for identifying a current situation in which a user is placed; an obtaining means for obtaining a situation in which the user was placed at a time of past authentication; a simplification means for simplifying, depending on the current situation identified by the identifying means and the past situation obtained by the obtaining means, authentication information to be input by the user, when the user is currently authenticated; and an output means for outputting information prompting for the authentication information simplified by the simplification means.

According to this invention, when a user remains authenticated, the information processing apparatus simplifies authentication information depending on the user's current situation and the user's situation at the time of past authentication. Thus, the user has only to input the simplified authentication information. Consequently, this can simplify authentication information to be input by a user while ensuring security.

The invention according to claim 2 is the information processing apparatus according to claim 1, wherein the obtaining means, the identifying means, the simplification means, and the output means operate every time the user being authenticated attempts to use a target utility requiring reauthentication, and the simplification means generates authentication information simplified at a simplicity lower than a previous simplicity, when authentication using authentication information simplified in response to a case where the situation identified by the identifying means and the situation obtained by the obtaining means agree is repeated.

According to this invention, even when the current and past situations agree, if authentication corresponding to a case where situations agree is repeated, the information processing apparatus lowers the simplicity for the authentication information. Thus, it takes more trouble to input authentication information than at the time of the previous authentication. Consequently, this can simplify authentication information to be input by a user while ensuring security.

The invention according to claim 3 is the information processing apparatus according to claim 1 or 2, wherein, when the current and past situations are different, the greater a difference between the situations is, the less simplified authentication information the simplification means generates.

According to this invention, the greater the difference between the current and past situations is, the lower the information processing apparatus sets the simplicity for the authentication information. Consequently, this can simplify authentication information to be input by a user while ensuring security.

The invention according to claim 4 is the information processing apparatus according to claim 3, wherein the obtaining means, the identifying means, the simplification means, and the output means operate every time the user being authenticated attempts to use a target utility requiring reauthentication, and the simplification means sets a situation difference, allowing authentication information to be simplified at a simplicity equal to a previous simplicity, smaller than previously set, every time authentication using authentication information simplified in response to a case where the situation identified by the identifying means and the situation obtained by the obtaining means are different is repeated.

According to this invention, when authentication corresponding to a case where the current and past situations are different is repeated, the situation difference, which allows the information processing apparatus to simplify the authentication information at a simplify equal to the simplicity at the time of the previous authentication, becomes smaller than the previous situation difference. Consequently, this can simplify authentication information to be input by a user while ensuring security.

The invention according to claim 5 is the information processing apparatus according to any one of claims 1 to 4, wherein the simplification means does not simplify the authentication information, when the current situation does not meet predetermined requirements for security.

According to this invention, when the situation in which the user is currently placed does not meet the requirements for security, the user has to input his or her whole authentication information to be originally input. Consequently, this can ensure security.

The invention according to claim 6 is the information processing apparatus according to any one of claims 1 to 5, wherein the simplification means changes, depending on the current and past situations, which part of authentication information to be originally input by the user the user is prompted based on the simplification to input.

According to this invention, the information processing apparatus changes the part that the user is prompted to input, thus changing the simplicity.

The invention according to claim 7 is the information processing apparatus according to claim 6, wherein, when the authentication information includes a plurality of codes, the simplification means changes which code type(s) of code(s) in authentication information to be originally input by the user the user is prompted based on the simplification to input, depending on a difference between the current and past situations.

According to this invention, the information processing apparatus changes the code type(s) of code(s) that the user is prompted to input, thus changing the simplicity.

The invention according to claim 8 is the information processing apparatus according to claim 6 or 7, wherein, when the authentication information includes a plurality of codes, the simplification means changes how many code types of codes in authentication information to be originally input by the user the user is prompted based on the simplification to input, depending on a difference between the current and past situations.

According to this invention, the information processing apparatus changes the number of code types of codes that the user is prompted to input, thus changing the simplicity.

The invention according to claim 9 is the information processing apparatus according to any one of claims 6 to 8, wherein, when the authentication information includes a plurality of codes, the simplification means changes how many codes among the plurality of codes included in the authentication information the user is prompted to input, depending on a difference between the current and past situations.

According to this invention, the information processing apparatus changes the number of codes that the user is prompted to input, thus changing the simplicity.

The invention according to claim 10 is the information processing apparatus according to any one of claims 1 to 9, further comprising: apart obtaining means for obtaining a part not included in the authentication information simplified by the simplification means from authentication information stored in storage means and to be originally input by the user; an authentication information obtaining means for obtaining authentication information generated by completing authentication information input in response to the information output by the output means with the part obtained by the part obtaining means; and a determining means for determining whether authentication of the user succeeds or fails, by comparing the authentication information obtained by the authentication information obtaining means with the authentication information stored in the storage means.

According to this invention, the information processing apparatus can determine whether the authentication succeeds or fails, based on whether the authentication information generated by the completion is identical to the authentication information stored in the storage means.

The invention according to claim 11 is the information processing apparatus according to any one of claims 1 to 9, further comprising: a position identification means for identifying a position of the authentication information simplified by the simplification means in authentication information stored in storage means and to be originally input by the user; and a determining means for determining whether authentication of the user succeeds or fails, by comparing authentication information input in response to the information output by the output means with a part at the position identified by the position identification means in the authentication information stored in the storage means.

According to this invention, whether the authentication succeeds or fails can be determined without completing the authentication information input by the user with any information.

The invention according to claim 12 is the information processing apparatus according to any one of claims 1 to 11, wherein the output means outputs predetermined a symbol for a part included in authentication information to be originally input by the user but not included in the authentication information simplified by the simplification means.

According to this invention, the predetermined symbols, which are viewed by the user, can make the user aware of which part in his or her authentication information to be originally input the user does not have to input.

The invention according to claim 13 is the information processing apparatus according to any one of claims 1 to 12, wherein the output means outputs second information prompting for whole authentication information to be originally input by the user, when authentication using authentication information input in response to the information output by the output means has failed.

According to this invention, even when the failure of the authentication using the simplified authentication information makes it doubtful whether the person who has input the simplified authentication information is the authenticated user, security can be ensured.

The invention according to claim 14 is the information processing apparatus according to any one of claims 1 to 13, wherein the simplification means simplifies identification information, of the user, to be entered by the user, and the output means outputs the information prompting for the identification information simplified by the simplification means.

According to this invention, the information processing apparatus simplifies the user's identification information depending on the user's current situation and the user's situation at the time of the past authentication. Consequently, this can simplify authentication information to be input by a user while ensuring security.

The invention according to claim 15 is an information processing method performed by a computer, the method comprising: an identifying step of identifying a current situation in which a user is placed; an obtaining step of obtaining a situation in which the user was placed at a time of past authentication; a simplification step of simplifying, depending on the current situation identified in the identifying step and the past situation obtained in the obtaining step, authentication information to be input by the user, when the user is currently authenticated; and an output step of outputting information prompting for the authentication information simplified in the simplification step.

The invention according to claim 16 is an information processing program for causing a computer to function as: an identifying means for identifying a current situation in which a user is placed; an obtaining means for obtaining a situation in which the user was placed at a time of past authentication; a simplification means for simplifying, depending on the current situation identified by the identifying means and the past situation obtained by the obtaining means, authentication information to be input by the user, when the user is currently authenticated; and an output means for outputting information prompting for the authentication information simplified by the simplification means.

Advantageous Effects of Invention

According to the present invention, when a user remains authenticated, the information processing apparatus simplifies authentication information depending on the user's current situation and the user's situation at the time of past authentication. Thus, the user has only to input the simplified authentication information. Consequently, this can simplify authentication information to be input by a user while ensuring security.

BRIEF DESCRIPTION OF DRAWINGS

FIG. 2A is a block diagram showing an example of a schematic configuration of the authentication device 1 according to an embodiment.

FIG. 2B is a diagram showing an example of functional blocks of the system controller 16 of the authentication device 1 according to an embodiment.

FIG. 3A is a diagram showing an example of how to determine a simplicity.

FIG. 3B is a diagram showing an example of how to determine the number of variations in character types of characters that a user is prompted to enter.

FIG. 3C is a diagram showing an example of simplifying a password.

FIG. 3D is a diagram showing an example of how to determine the number of character types of characters that a user is prompted to enter.

FIG. 3E is a diagram showing an example of simplifying a password.

FIG. 3F is a diagram showing an example of how to determine the number of characters that a user is prompted to enter.

FIG. 3G is a diagram showing an example of simplifying a password.

FIG. 5 is a flowchart showing an example of a login authentication process in the system controller 16 of the authentication device 1 according to an embodiment.

FIG. 8A is a flowchart showing an example of an input character determination process.

FIG. 8B is a flowchart showing an example of the input character determination process.

FIG. 8C is a flowchart showing an example of the input character determination process.

FIG. 11 is a diagram showing an example of how to determine the simplicity.

FIG. 14 is a diagram showing an example of how to determine the simplicity.

FIG. 16A is a diagram showing an example of how to determine the simplicity.

FIG. 16B is a diagram showing an example of how to determine the simplicity.

FIG. 16C is a diagram showing an example of how to determine the simplicity.

DESCRIPTION OF EMBODIMENTS

The following describes embodiments of the present invention in detail with reference to the drawings. The embodiments described below are embodiments in which the present invention is applied to an authentication device that performs authentication using a password including a plurality of character codes. A password as data includes character codes indicating characters in practice. In the embodiments, for convenience of explanation, character codes are also referred to simply as characters. In the embodiments, symbols are also included in the characters.

1. First Embodiment

The authentication device is a computer that performs user authentication using a password entered by a user. The authentication device simplifies the password to be entered by the user, based on the user's current situation and a situation in which the user was placed in the past. The authentication device may be, for example, a server device or a terminal device. The authentication device implemented on a server device will be described first, and then the authentication device implemented on a terminal device will be described.

1-1. Overview of Information Processing System

Figure 1A:
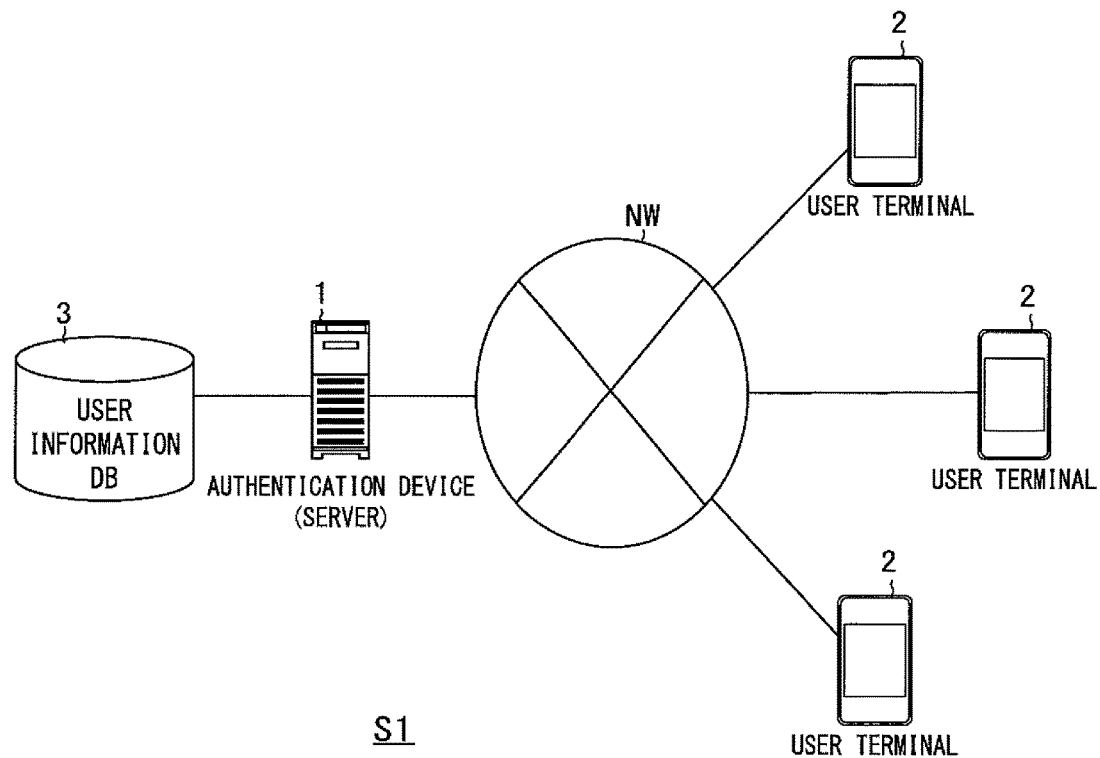
FIG. 1A is a diagram showing an example of a schematic configuration of an information processing system S1 in which an authentication device 1 is implemented on a server device.

First, an overview of an information processing system S1 according to this embodiment will be described with reference to FIG. 1. FIG. 1A is a diagram showing an example of a schematic configuration of the information processing system S1 in which an authentication device 1 is implemented on a server device.

As shown in FIG. 1A, the information processing system S1 includes the authentication device 1 as a server device, and a plurality of user terminals 2. The authentication device 1 can exchange data with each user terminal 2 via a network NW using communication protocols, such as TCP/IP. The network NW includes, for example, the Internet, a dedicated communication line (e.g., community antenna television (CATV) line), a mobile communication network (including base stations), and a gateway.

The authentication device 1 may be a server device that performs processes for providing predetermined services to users who use the information processing system S1. Alternatively, the authentication device 1 may be an authentication server that performs user authentication required for users to receive services provided by the information processing system S1. The authentication device 1 is configured so that it can access a user information DB 3. The user information DB 3 is a database that stores information about users who have signed up for the information processing system S1. For example, the user information DB 3 stores, for each user, his or her user ID, his or her password, and other information in association with each other. The user ID is identification information of the user. The password is an example of authentication information of the present invention. The information processing system S1 may include the user information DB 3 in it or be connected to the user information DB 3 via a network. The user information DB 3 may store, for example, only passwords that meet predetermined registration requirements. The registration requirements may be, for example, that the number of characters in a password is equal to or greater than a predetermined number. Alternatively, the registration requirements may be, for example, that the number of characters in a password is equal to or greater than a first predetermined number and also equal to or less than a second predetermined number. Alternatively, the registration requirements may be, for example, that the number of character types of characters included in a password is equal to or greater than a predetermined number. Alternatively, the registration requirements may be, for example, that the characters included in a password must include a predetermined character type(s) of character(s). Alternatively, the registration requirements may be a combination of a plurality of requirements. An administrator can freely choose character type(s) of character(s) that can be used in a password. Examples of the character types include lowercase letters, uppercase letters, numerals, symbols, and multibyte characters. Examples of the multibyte characters include kanji, hiragana, and katakana. When authenticating a user, the authentication device 1 receives his or her user ID and password from the user terminal 2. For example, the authentication device 1 retrieves the password corresponding to the received user ID from the user information DB 3, and determines whether the retrieved password is identical to the received password. The authentication device 1 determines that the authentication succeeds if the passwords are identical, and determines that the authentication fails if the passwords are not identical. If the authentication has succeeded, the user can log in to the information processing system S1.

The user terminal 2 is a terminal device used by a user who intends to use the information processing system S1. Examples of the terminal device include smartphones, tablet computers, mobile phones, personal computers, personal digital assistants (PDAs), and set top boxes (STBs). The user terminal 2 may include, for example, a central processing unit (CPU), a read only memory (ROM), a random access memory (RAM), a flash memory, and a hard disk drive. The user terminal 2 also has software, such as a browser and an e-mail client, installed on it.

Once the user has logged in to the information processing system S1, the user remains authenticated by the authentication device 1, for example, until the user performs a logout operation. That is, the logged-in user remains authenticated. For example, if a predetermined period of time has elapsed since the login, the authentication device 1 may automatically terminate the login. The logged-in user can use basic services and functions that the information processing system S1 provides to its members. However, even when the user is logged in, if the user requests the authentication device 1 to provide a specific service or function, the authentication device 1 performs reauthentication of the user. The services and functions are examples of a target utility of the present invention. For example, such a service or a function requires security among services or functions provided by the information processing system S1. Examples of such a service or a function include purchasing an item, reserving a service, viewing a purchase history, and changing member information. In this case, the user has to enter his or her password again. In reentering the password, the authentication device 1 may allow the user to omit the entry of his or her user ID. Nevertheless, it can be burdensome for the user to enter his or her whole password stored in the user information DB 3, every time the user uses the specific service or function. Due to such a reason, omitting the entry of the password may be an option. However, the entry of the password should not be omitted in terms of security.

Thus, when reauthentication of the logged-in user is required, the authentication device 1 simplifies the password to be entered by the user, depending on a situation in which the user is currently placed and a situation in which the user was placed at the time of past authentication. Then, the authentication device 1 outputs information prompting the user to enter his or her simplified password. In contrast to the simplified password, the password stored in the user information DB 3 is referred to as the registered password. The registered password is the password to be originally entered. Password simplification is, for example, to reduce the number of characters to be entered in the registered password. Thus, the simplified password becomes shorter than the registered password. Consequently, it is easier for the user to enter his or her simplified password than to enter his or her whole registered password. The authentication device 1 may determine, for example, the security in the current situation based on the user's current and past situations. The security in this case may be, for example, the probability that the person who enters a password is the user himself or herself. That is, the higher the probability that the person who enters a password is the user himself or herself is, the more easy-to-enter password the user is prompted to enter. This can simplify authentication information to be entered by a user while ensuring security.

1-2. Configuration of Authentication Device

The following describes a configuration of the authentication device 1 with reference to FIG. 2A. FIG. 2A is a block diagram showing an example of a schematic configuration of the authentication device according to this embodiment. As shown in FIG. 2A, the authentication device 1 includes a communication unit 11, a storage unit 12, an input unit 13, a display unit 14, an input/output interface 15, and a system controller 16. The system controller 16 and the input/output interface 15 are connected via a system bus 17.

The communication unit 11 connects to the network NW and controls the state of communications with, for example, the user terminal 2. The storage unit 12 stores data and programs. Examples of the storage unit 12 include hard disk drives and flash memories. The storage unit 12 may store, for example, the user information DB 3. The storage unit 12 further stores an operating system, an authentication process program, and other programs. The authentication process program is a program for performing processes related to user authentication. The authentication process program is an example of an information processing program according to the present invention. For example, these various programs may be acquired from another server device or the like via the network NW, or may be recorded in a recording medium, such as an optical disk, and be read via a drive device. The input unit receives operations by an operator and outputs signals corresponding to the operations to the system controller 16. Examples of the input unit 13 include keys, buttons, switches, a keyboard, a mouse, a touch screen, and a remote control. The authentication device 1 may not include the input unit 13. For example, the authentication device 1 may be connected to the input unit 13 through a wired or wireless connection. The display unit 14 is controlled by the system controller 16 to display images, characters, and other information. Examples of the display unit 14 include a liquid crystal display, a CRT display, and LEDs. The authentication device 1 may not include the display unit 14. For example, the authentication device 1 may be connected to the display unit 14 through a wired or wireless connection. The input/output interface 15 performs interface processing between the communication unit 11 and the storage unit 12, and the system controller 16. The system controller 16 includes, for example, a CPU 16a, a ROM 16b, and a RAM 16c. The CPU 16a is an example of a processor. The present invention can also be applied to various processors other than CPUs. The storage unit 12, the ROM 16b, and the RAM 16c are each an example of a memory. The present invention can also be applied to various memories other than hard disks, ROMs, and RAMs.

1-3. Functional Overview of System Controller

The following describes a functional overview of the system controller 16 with reference to FIGS. 2B to 4D. FIG. 2B is a diagram showing an example of functional blocks of the system controller 16 of the authentication device 1 according to this embodiment. As shown in FIG. 16, the authentication process program and other programs, read and executed by the CPU 16a, enable the system controller 16 to function as, for example, a current user situation identification unit 161, a past user situation obtaining unit 162, a simplification unit 163, a password entry screen output unit 164, and an authentication unit 165. The current user situation identification unit 161 is an example of identifying means of the present invention. The past user situation obtaining unit 162 is an example of obtaining means of the present invention. The simplification unit 163 is an example of simplification means of the present invention. The password entry screen output unit 164 is an example of output means of the present invention. The authentication unit 165 is an example of determining means of the present invention.

In authenticating a user, the current user situation identification unit 161 identifies a situation in which the user is currently placed. For example, the current user situation identification unit 161 obtains user situation information indicating the user's situation. Examples of the user's situation include the user's location, the location of the user terminal 2 used by the user, and time. The locations of the user and the user terminal 2 are, for example, their absolute locations and their relative positions. Examples of the user situation information indicating their absolute locations include the geographical location of the user or the user terminal 2, and the IP address assigned to the user terminal 2. Examples of the user situation information indicating their relative positions include the distance from a specific device and the distance from a person other than the user. The current user situation identification unit 161 may identify one situation or identify a plurality of situations.

When the user terminal 2 is equipped with a global positioning system (GPS) unit, the user terminal 2 can obtain positional information indicating, for example, the latitude and longitude of the user terminal 2. For example, when the user terminal 2 is a mobile communication terminal, such as a smartphone or a mobile phone, the positional information of user terminal 2 can be obtained based on the positional information of base stations. In such a case, the current user situation identification unit 161 may obtain the positional information as the user situation information from the user terminal 2. The current user situation identification unit 161 can also obtain, as the user situation information, the IP address of the user terminal 2 from the header of a packet sent from the user terminal 2 to the authentication device 1. Based on the IP address, the area where the user terminal 2 is located, for example, may be identified. For example, when the user terminal 2 establishes a connection to the network NW through a wireless LAN, the user terminal 2 connects to the wireless LAN by communicating with an access point. At this time, the user terminal 2 may detect the intensity of signals transmitted from the access point. Based on the intensity of the signals, the distance from the access point to the user terminal 2 can be roughly estimated. This distance is an example of the relative position. In such a case, the current user situation identification unit 161 may obtain, from the user terminal 2, for example, information identifying the access point and information indicating the distance from the access point as the user situation information. Examples of the information identifying the access point include the IP address and a service set identifier (SSID) of the access point. Examples of information indicating the distance include the intensity of signals from the access point and the distance estimated by the user terminal 2 based on the intensity of the signals. The system controller 16 has a timer function. Thus, the current user situation identification unit 161 can obtain the current time as the user situation information by using the timer function.

When reauthentication of the logged-in user is required, the past user situation obtaining unit 162 obtains a situation in which the user was placed at the time of the past authentication. For example, when user authentication required for a user to log in to the information processing system S1 has succeeded, the authentication unit 165 stores login session information in the storage unit 12. The login session information is information for identifying the logged-in user. The login session information includes, for example, a user ID and a session ID. The user ID indicates the logged-in user. The session ID is identification information of the session. For example, when the user authentication has succeeded, the authentication unit 165 may put the user situation information obtained by the current user situation identification unit 161 at that moment in the login session information. In this case, during the reauthentication, the past user situation obtaining unit 162 may obtain the user situation information from the login session information. The past user situation obtaining unit 162 may obtain, for example, the user's situation at the time of login or the user's situation when reauthentication of the logged-in user has succeeded. That is, the past user situation obtaining unit 162 may obtain the situation when authentication of the user who entered his or her whole registered password has succeeded or the situation when authentication of the user who entered his or her simplified password has succeeded.

The simplification unit 163 simplifies the password to be entered by the user, depending on the user's current situation identified by the current user situation identification unit 161 and the user's past situation identified by the past user situation obtaining unit 162. For example, the simplification unit 163 may determine a simplicity of the password, depending on whether the user's current and past situations agree, or depending on the difference between the user's current and past situations. Then, the simplification unit 163 may simplify the password based on the determined simplicity. The simplicity indicates how much the password is simplified. For example, the authentication device 1 reduces the simplicity for relatively low security, and increases the simplicity for relatively high security. For example, the higher the security in the current situation identified based on the current and past situations is, the more the simplification unit 163 may increase the simplicity. Thus, the simplicity also indicates the security in the current situation. The simplification unit 163 may not determine the simplicity. In this case, the simplification unit 163 may simplify the password based on a degree corresponding to the user's current and past situations.

In this embodiment, assume that the simplification unit 163 determines the simplicity depending on whether the current and past situations agree. FIG. 3A is a diagram showing an example of how to determine the simplicity. For example, if the user's current situation agrees with the situation when the authentication of the user succeeded in the past, the current situation is expected to be more secure than when these situations disagree. Specifically, when the situation has not changed since the authentication of the user succeeded in the past, the probability that the person who enters a password is the user himself or herself is higher than when the situation has changed. Thus, as shown in FIG. 3A, when the situations agree, the simplification unit 163 may set the simplicity higher than when the situations disagree. The simplification unit 163 determines whether the current and past situations agree, by comparing the user situation information obtained by the current user situation identification unit 161 with the user situation information obtained by the past user situation obtaining unit 162. That is, for example, the simplification unit 163 compares the current location of the user or the user terminal 2 with the location of the user or the user terminal 2 at the time of the past authentication, or compares the current time with the time of the past authentication. Here, if the pieces of user situation information agree, the past user situation obtaining unit 162 determines that the situations agree. For example, even when the pieces of user situation information disagree, if the difference between the pieces of user situation information is equal to or less than a predetermined value, the past user situation obtaining unit 162 may determine that the situations agree. If the difference between the pieces of user situation information exceeds the predetermined value, the past user situation obtaining unit 162 may determine that the situations disagree.

For example, the simplification unit 163 changes which part of the registered password the user is prompted based on simplification to enter, depending on the user's current and past situations. For example, the higher the security in the current situation identified based on the current and past situations is, the more easy-to-enter, easy-to-memorize, or easy-to-remember part the simplification unit 163 may simplify the password into.

There are various simplification methods for changing which part the user is prompted to enter. For example, the simplification unit 163 may change which character type(s) of character(s) in the registered password the user is prompted to enter, depending on the current and past situations. FIG. 3B is a diagram showing an example of how to determine the number of variations in character types of characters that the user is prompted to enter. Usually, a password includes a plurality of character types of characters. Each character type has a different number of characters in it. For example, the number of numerals is 10, and the number of lowercase letters is 26. The number of characters belonging to a character type is referred to as the number of variations. Usually, characters of a character type having a smaller number of variations are easier to guess. Thus, as shown in FIG. 3B, when the security is lower, that is, when the simplicity is lower, the simplification unit 163 may determine a character type having a greater number of variations as the] (s) that the user is prompted to enter. FIG. 3C is a diagram showing an example of simplifying a password. For example, assume that the registered password is "q3nifa83e". For a secure situation, the simplification unit 163 may simplify the password into, for example, "383". For an insecure situation, the simplification unit 163 may simplify the password into, for example, "qni". When the registered password includes three or more character types, the simplification unit 163 may select two or more from among the three or more character types as the types of characters that the user is prompted based on simplification to enter.

Also for example, the simplification unit 163 may change how many character types of characters in the registered password the user is prompted to enter, depending on the current and past situations. FIG. 3D is a diagram showing an example of how to determine the number of character types of characters that the user is prompted to enter. Usually, the smaller the number of character types of characters in a password to enter is, the easier it is to enter the password. Thus, as shown in FIG. 3D, the lower the security is, that is, when the lower the simplicity is, the more character types of characters the simplification unit 163 may prompt the user to enter. FIG. 3E is a diagram showing an example of simplifying a password. For example, assume that the registered password is "q3nifa83e". For a secure situation, the simplification unit 163 may simplify the password into, for example, "nifa". For an insecure situation, the simplification unit 163 may simplify the password into, for example, "a83e". The characters in the simplified password, which the user is prompted to enter, may or may not be arranged side by side in the registered password.

Also for example, the simplification unit 163 may change how many characters in the registered password the user is prompted to enter, depending on the current and past situations. FIG. 3F is a diagram showing an example of how to determine the number of characters that the user is prompted to enter. The smaller the number of characters in a password to enter is, the easier it is to enter the password. Thus, as shown in FIG. 3F, for example, the lower the security is, that is, when the lower the simplicity is, the more characters the simplification unit 163 may prompt the user to enter. FIG. 3G is a diagram showing an example of simplifying a password. For example, assume that the registered password is "q3nifa83e". For a secure situation, the simplification unit 163 may simplify the password into, for example, "q3n". For an insecure situation, the simplification unit 163 may simplify the password into, for example, "q3ni". The simplification unit 163 may select the characters that the user is prompted to enter, for example, from among the first characters of the registered password, from among the last characters of the registered password, or from among the middle characters of the registered password.

Also for example, the simplification unit 163 may change the positions of the characters, in the registered password, which the user is prompted to enter, depending on the current and past situations. Usually, it is easier for the user to enter the first characters of the registered password than the last characters. Specifically, for a secure situation, the simplification unit 163 may simplify the password into, for example, a predetermined number of the first characters thereof. For an insecure situation, the simplification unit 163 may simplify the password into, for example, a predetermined number of the last characters thereof. Also for example, the simplification unit 163 may change whether to prompt the user to enter characters arranged side by side in the registered password, depending on the current and past situations. Usually, it is easier for the user to enter continuous characters in his or her registered password than discontinuous characters. For a secure situation, the simplification unit 163 may simplify the password into, for example, the first to third characters in the registered password. For an insecure situation, the simplification unit 163 may simplify the password into, for example, its first, third, and fifth characters. Also for example, the simplification unit 163 may combine a plurality of simplification methods to determine which part of the registered password the user is prompted to enter. Also for example, the simplification unit 163 may determine how to simplify the password, depending on the characters in the registered password.

The password entry screen output unit 164 outputs information prompting for the simplified password. Specifically, the password entry screen output unit 164 outputs a web page for a password entry screen to the user terminal 2.

Figure 4A:
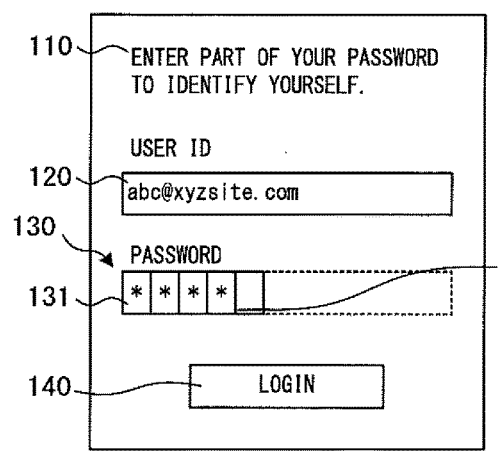
FIG. 4A is a diagram showing a display example of a password entry screen.

FIG. 4A is a diagram showing a display example of the password entry screen. The password entry screen displays a message 110, a user ID entry field 120, a password entry field 130, and a submit button 140. The message 110 is a message prompting for the simplified password. The user ID entry field 120 is a field for entering a user ID. However, the user ID entry field 120 is prefilled with the user ID entered by the user at the time of login. Thus, the user does not have to change the user ID in the user ID entry field 120. The user ID entry field 120 may not be prefilled with the user ID. In this case, the user has to enter his or her user ID again. Alternatively, for example, the user ID entry field 120 may not be displayed. In this case, the user has only to enter his or her password. The password entry field 130 is a field for entering a password. One or more asterisks 131 are displayed in the password entry field 130. Specifically, the asterisks 131 are displayed corresponding to the positions of the characters included in the registered password but not included in the simplified password. FIG. 4A shows an example where a registered password consisting of seven characters is simplified into its last three characters. Thus, the asterisks 131 corresponding to the first four characters are displayed in the password entry field 130. The asterisks 131 can make the user aware of which characters in his or her registered password do not have to be entered. In addition, some characters included in the registered password are not displayed, so that security can be ensured. Such symbol may be symbols other than asterisks. A cursor 132 is further displayed in the password entry field 130. The cursor 132 indicates which position in the simplified password a character will be entered at. For example, the cursor 132 is displayed at the position of the first character of the part to be entered by the user in the registered password. Every time the user enters a character in the password entry field 130, an asterisk is displayed at the entry position and the cursor 132 moves to the right. The submit button 140 is a button for sending a password.

Figure 4B:
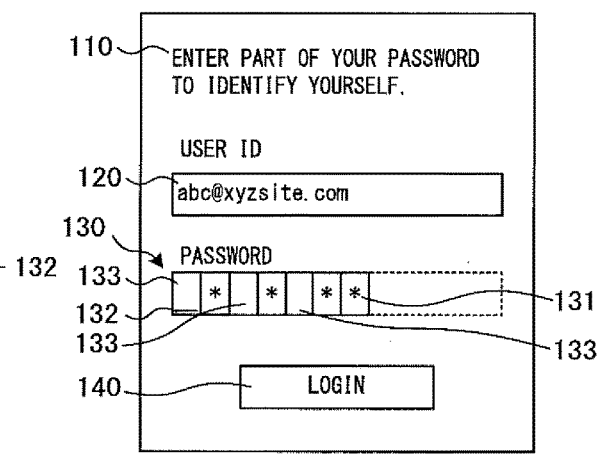
FIG. 4B is a diagram showing a display example of the password entry screen.

FIG. 4B is a diagram showing a display example of the password entry screen when a registered password consisting of seven characters is simplified into its first, third, and fifth characters. As in FIG. 4A, in the password entry field 130, the asterisks 131 are displayed corresponding to the second, fourth, sixth, and seventh characters. Character entry fields 133 are displayed corresponding to the first, third, and fifth characters. The cursor 132 is displayed in the leftmost character entry field 133. When the user enters a character, the cursor 132 may move to the character entry field 133 on the right of the character entry field 133 in which the character has been entered. For example, when the user enters the first character, the cursor 132 moves to the position of the third character. The password entry field 130 may be designed so that the characters corresponding to the display positions of the asterisks 131, that is, the part included in the registered password but not included in the simplified password, can be overwritten by the user. In this case, when the user enters the first character, for example, the cursor 132 may move to the asterisk 131 corresponding to the position of the second character. Here, the user can overwrite the character corresponding to the asterisk 131 or move the cursor 132 without overwriting the character. The characters corresponding to the display positions of the asterisks 131 are portions that the user does not have to enter. Thus, even if such characters have been overwritten, the system controller 16 may perform authentication of the user by using only the characters entered in the character entry fields 133. In this case, whether the characters corresponding to the display positions of the asterisks 131 have been overwritten and whether characters newly entered by overwriting are correct do not affect the result of the authentication. For example, the system controller 16 may perform authentication of the user also by using the overwritten characters. In this case, if any of the characters corresponding to the display positions of the asterisks 131 has been overwritten with an incorrect character, the authentication fails.

Figure 4C:
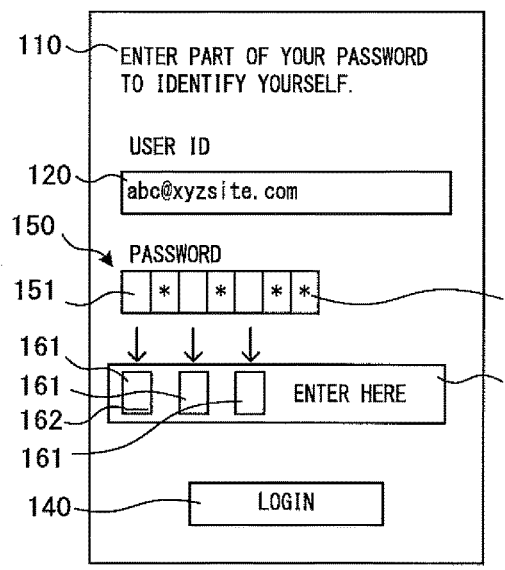
FIG. 4C is a diagram showing a display example of the password entry screen.

FIG. 4C is a diagram showing a display example of the password entry screen, which is different from those in FIGS. 4A and 4B. As shown in FIG. 4C, the password entry screen displays the message 110, the user ID entry field 120, a character entry position display area 150, a simplified password entry field 160, and the submit button 140. The character entry position display area 150 indicates the positions of the characters to be entered by the user in the registered password. In the character entry position display area 150, blanks 151 are displayed corresponding to the positions of the characters included in the registered password and the simplified password, and asterisks 152 are displayed corresponding to the positions of the characters included in the registered password but not included in the simplified password. In the simplified password entry field 160, one or more character entry fields 161 are displayed. Each character entry field 161 is an entry field for entering one character in the simplified password. The positions of the character entry fields 161 correspond one-to-one to the positions of the blanks 151 in the character entry position display area 150. Thus, the user can recognize which positions to enter characters at. In the leftmost character entry field 161, a cursor 162 indicating the entry position is displayed. When the user enters a character in any of the character entry fields 161, for example, an asterisk may be displayed in the position, and the cursor 162 may move to the character entry field 161 on the right of the character entry field 161 in which the character has been entered.

Figure 4D:
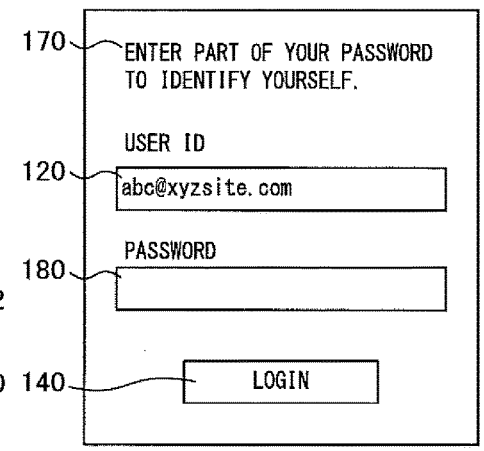
FIG. 4D is a diagram showing a display example of the password entry screen.

When authentication using the password entered on the password entry screen has failed, the password entry screen output unit 164 causes the user terminal 2 to display the password entry screen to prompt the user to enter his or her password again. At this time, the password entry screen output unit 164 may cause the user terminal 2 to display the password entry screen for entering the simplified password or the password entry screen for entering the whole registered password. Prompting the user to enter his or her registered password when the authentication has failed can ensure security. FIG. 4D is a diagram showing a display example of the password entry screen for entering the whole registered password. As shown in FIG. 4D, the password entry screen displays a message 170, the user ID entry field 120, a password entry field 180, and the submit button 140. The message 170 is a message prompting for the whole registered password. The password entry field 180 is an entry field for entering the whole registered password.

The authentication unit 165 performs an authentication process using the password entered by the user on the password entry screen. In this embodiment, the authentication unit 165 obtains, as a password for authentication, a password generated by completing the password entered by the user with the part included in the registered password but not included in the simplified password. Then, the authentication unit 165 determines whether authentication of the user succeeds or fails, by comparing the password for authentication with the registered password. For example, when a registered password consisting of seven characters is simplified into its last three characters, a password for authentication is generated by adding the first four characters of the registered password before the password entered by the user. For example, the user terminal 2 may perform the completion. In this case, the authentication unit 165 obtains the password for authentication from the user terminal 2.

1-4. Operation of Information Processing System

The following describes an operation of the information processing system S1 with reference to FIGS. 5 to 10B. FIG. 5 is a flowchart showing an example of a login authentication process in the system controller 16 of the authentication device 1 according to this embodiment. For example, in response to a login request from the user terminal 2, the authentication device 1 outputs a web page for a login screen to the user terminal 2. The login screen is a screen for entering a user ID and a whole registered password. When a user enters his or her user ID and password on the login screen, the user terminal 2 sends the user ID and the password to the authentication device 1. When the user ID and the password are received from the user terminal 2, the system controller 16 performs the login authentication process. As shown in FIG. 5, the authentication unit 165 determines whether the same user ID and password combination as a combination of the received user ID and password is stored in the user information DB 3 (Step S1). Here, if the authentication unit 165 determines that the same combination is not stored (NO in Step S1), the process proceeds to Step S2. In Step S2, the authentication unit 165 outputs the web page for the login screen again, and terminates the login authentication process. On the other hand, if the authentication unit 165 determines that the same combination is stored (YES in Step S1), the process proceeds to Step S3. In Step S3, the current user situation identification unit 161 obtains user situation information indicating the user's current situation. For example, the current user situation identification unit 161 may obtain, from the user terminal 2, information indicating the absolute location of the user or the user terminal 2, or information indicating the relative position of the user or the user terminal 2. Alternatively the current user situation identification unit 161 may obtain the current time, for example, from a timer unit. Subsequently, the authentication unit 165 generates login session information and stores it in the storage unit 12 (Step S4). Specifically, the authentication unit 165 generates a new session ID. Then, the authentication unit 165 generates login session information including, for example, the user ID received from the user terminal 2, the session ID, and the user situation information. For example, the authentication unit 165 may put a validity period for the login in the login session information. After Step S4, the authentication unit 165 outputs a web page for a screen displayed after completion of the login to the user terminal 2 (Step S5). At this time, the authentication unit 165 may send a cookie including the generated session ID to the user terminal 2. Thus, the session ID will be included in a request to be sent from the user terminal 2 of the logged-in user to the authentication device 1. After Step S5, the authentication device 1 terminates the login authentication process. When the user logs out of the information processing system S1, the authentication device 1 deletes the login session information from the storage unit 12.

Figure 6:
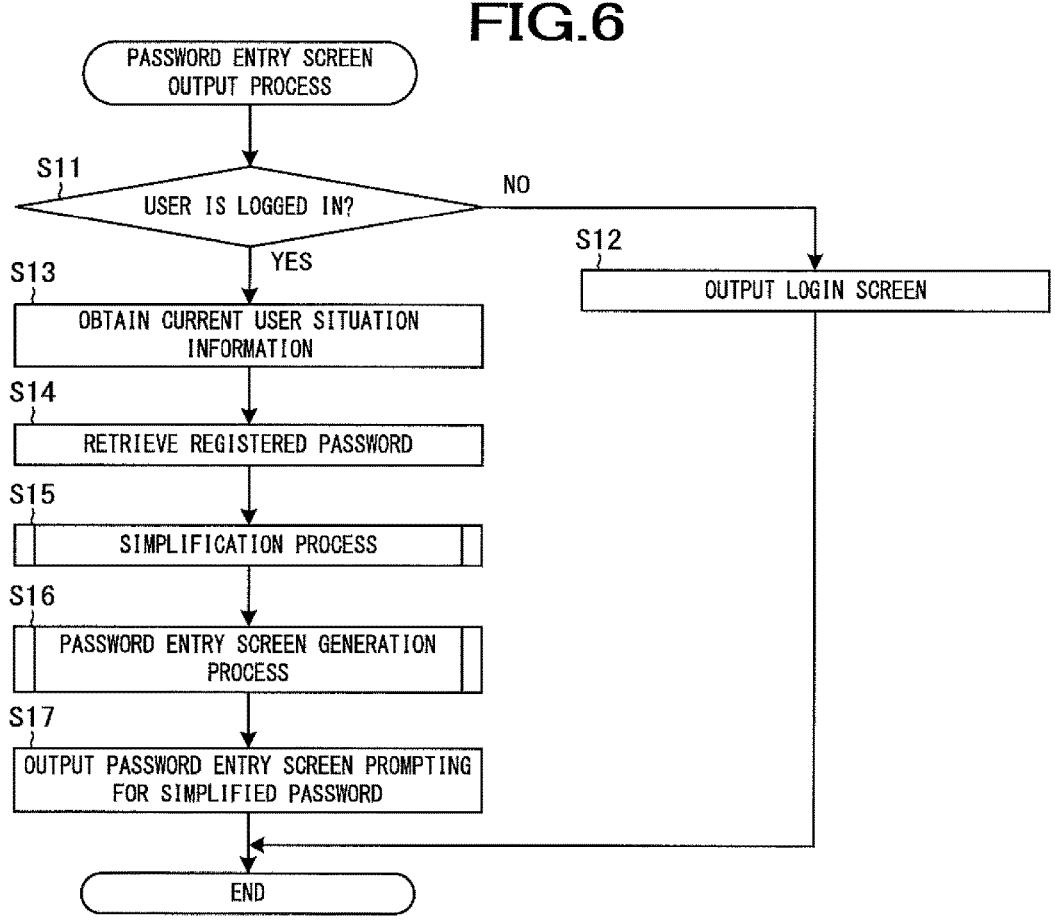
FIG. 6 is a flowchart showing an example of a password entry screen output process in the system controller 16 of the authentication device 1 according to an embodiment.

FIG. 6 is a flowchart showing an example of a password entry screen output process in the system controller 16 of the authentication device 1 according to this embodiment. For example, assume that a user performs an operation for using a specific service or function requiring reauthentication among the services or the functions provided by the information processing system S1. At this time, the user terminal 2 sends a specific utility request to the authentication device 1. When the specific utility request is received from the user terminal 2, the system controller 16 performs the password entry screen output process. As shown in FIG. 6, the authentication unit 165 determines whether the user is logged in (Step S11). For example, when the specific utility request does not include a session ID, the authentication unit 165 determines that the user is not logged in. Alternatively, for example, when the login session information corresponding to the session ID included in the specific utility request is not stored in the storage unit 12, the password entry screen output unit 164 determines that the user is not logged in. Alternatively, for example, when the validity period included in the login session information has expired, the password entry screen output unit 164 determines that the user is not logged in. If the user is not logged in (NO in Step S11), the authentication unit 165 causes the process to proceed to Step S12. In Step S12, the authentication unit 165 outputs the web page for the login screen to the user terminal 2, and terminates the password entry screen output process.

On the other hand, for example, if the validity period in the login session information corresponding to the session ID included in the specific utility request has not expired, the authentication unit 165 determines that the user is logged in (YES in Step S11). In this case, the authentication unit 165 causes the process to proceed to Step S13. In Step S13, the current user situation identification unit 161 obtains user situation information indicating the user's current situation. Step S13 is the same as Step S3 of the login authentication process shown in FIG. 5. Subsequently, the simplification unit 163 retrieves, from the user information DB 3, the registered password corresponding to the user ID included in the identified login session information (Step S14). Then, the simplification unit 163 performs a simplification process (Step S15). The simplification process is a process for simplifying the password to be entered by the user. Next, the password entry screen output unit 164 performs a password entry screen generation process (Step S16). The password entry screen generation process is a process for generating a web page for the password entry screen for entering the simplified password. The simplification process and the password entry screen generation process are described in detail below. Then, the password entry screen output unit 164 outputs the generated web page for the password entry screen to the user terminal 2 (Step S17). After Step S17, the password entry screen output unit 164 terminates the password entry screen output process.

Figure 7:
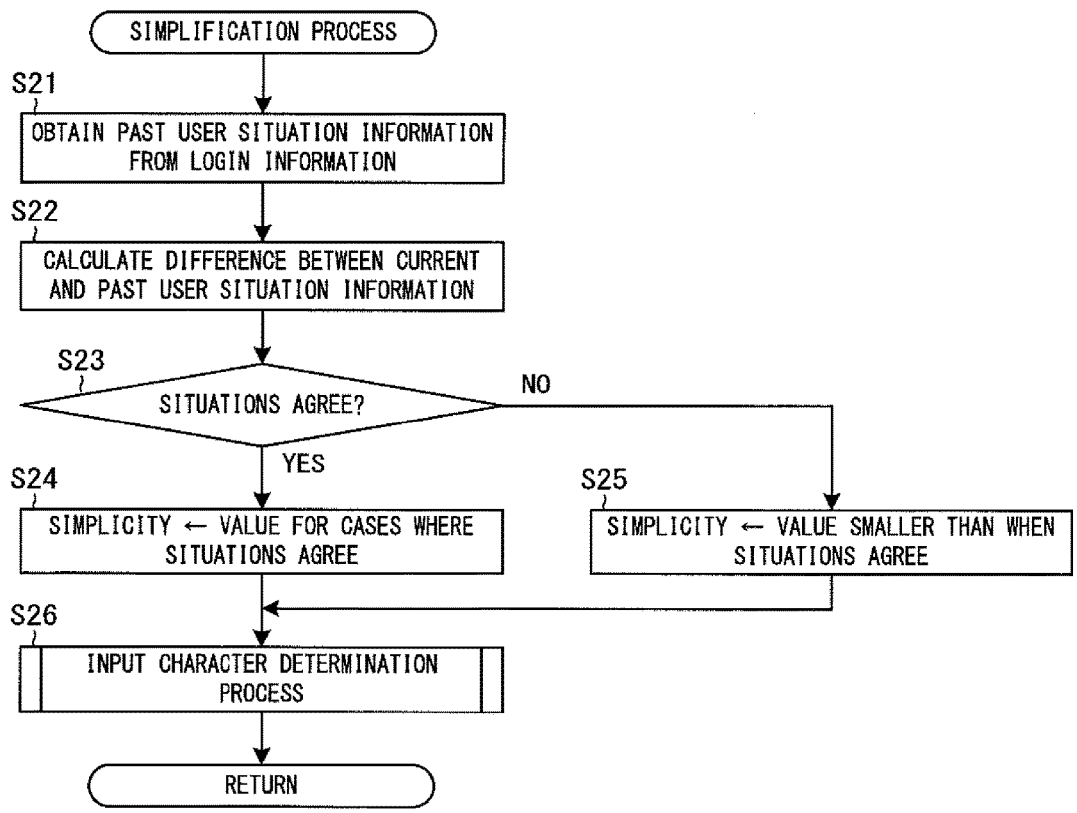
FIG. 7 is a flowchart showing an example of a simplification process in the system controller 16 of the authentication device 1 according to an embodiment.

FIG. 7 is a flowchart showing an example of the simplification process in the system controller 16 of the authentication device 1 according to this embodiment. As shown in FIG. 7, the simplification unit 163 obtains the user situation information indicating the user's past situation from the login session information identified in the password entry screen output process (Step S21). Subsequently, the simplification unit 163 calculates the difference between the user situation information obtained in the password entry screen output process and the user situation information obtained from the login session information (Step S22). Then, the simplification unit 163 determines whether the user's current and past situations agree, based on the difference between the pieces of user situation information (Step S23). Here, if the simplification unit 163 determines that the situations agree (YES in Step S23), the process proceeds to Step S24. In Step S24, the simplification unit 163 sets the simplicity to a value for cases where the situations agree, and the process proceeds to the Step S26. On the other hand, if the simplification unit 163 determines that the situations disagree (NO in Step S23), the process proceeds to Step S25. In Step S25, the simplification unit 163 sets the simplicity to a value for cases where the situations disagree, and the process proceeds to the Step S26. The simplicity for cases where the situations disagree is lower than the simplicity for cases where the situations agree. In Step S26, the simplification unit 163 performs an input character determination process, and terminates the simplification process.

The input character determination process is a process for determining which part of the registered password the user is prompted to enter. Details of the input character determination process depend on how to determine the part that the user is prompted to enter. Thus, the following describes the input character determination process for each example of how to determine the part to be entered. FIG. 8A is a flowchart showing a first example of the input character determination process. In the first example, the simplification unit 163 changes which character type(s) of character(s) in the registered password the user is prompted to enter, depending on the user's current and past situations. As shown in FIG. 8A, the simplification unit 163 identifies what character types of characters are included in the registered password (Step S31). Subsequently, the simplification unit 163 determines a ranking of the identified character types in descending order of the number of their variations (Step S32). Then, the simplification unit 163 determines which character type(s) of character(s) the user is prompted to enter, based on the variation ranking of the character types and the simplicity (Step S33). For example, the higher the simplicity is, the lower-ranking character type(s) the simplification unit 163 selects. For example, the storage unit 12 may store a table storing the numbers of character types of characters included in a registered password, simplicities, and rankings of character types to be entered by a user in association with each other. The simplification unit 163 may select the character type(s) that the user is prompted to enter, by referring to this table. Next, the simplification unit 163 selects, from the registered password, for example, a predetermined number of characters having the selected character type(s) as the characters to be entered by the user (Step S34). Then, the simplification unit 163 stores, in the storage unit 12, position numbers indicating the positions of the selected characters in association with the login session information (Step S35). After Step S35, the simplification unit 163 terminates the input character determination process.

FIG. 8B is a flowchart showing a second example of the input character determination process. In the second example, the simplification unit 163 changes how many character types of characters in the registered password the user is prompted to enter, depending on the user's current and past situations. As shown in FIG. 8B, the simplification unit 163 identifies what character types of characters are included in the registered password (Step S41). Subsequently, the simplification unit 163 calculates the number of the identified character types (Step S42). Then, the simplification unit 163 determines how many character types of characters the user is prompted to enter, based on the number of character types of characters included in the registered password and the simplicity (Step S43). For example, the simplification unit 163 may determine how many character types of characters the user is prompted to enter, within the range from one to one less than the number of the character types. At this time, the higher the simplicity is, the fewer character types the simplification unit 163 selects. For example, the storage unit 12 may store a table storing the numbers of character types of characters included in a registered password, simplicities, and the numbers of character types of characters to be entered by a user in association with each other. The simplification unit 163 may determine how many character types of characters the user is prompted to enter, by referring to this table. Then, the simplification unit 163 selects, from among the identified character types of characters included in the registered password, the determined number of character type(s) as the character type(s) of character(s) to be entered by the user (Step S44). At this time, the simplification unit 163 may select the character type(s), for example, randomly or in accordance with a predetermined criterion. Next, the simplification unit 163 selects, from the registered password, for example, a predetermined number of characters having the selected character type(s) as the characters to be entered by the user (Step S45). At this time, the simplification unit 163 selects, for each of the selected character type(s), at least one character having the character type. Then, the simplification unit 163 stores, in the storage unit 12, position numbers indicating the positions of the selected characters in association with the login session information (Step S46). After Step S46, the simplification unit 163 terminates the input character determination process.

FIG. 8C is a flowchart showing a third example of the input character determination process. In the third example, the simplification unit 163 changes how many characters in the registered password the user is prompted to enter, depending on the user's current and past situations. As shown in FIG. 8C, the simplification unit 163 determines how many characters the user has to enter, based on the simplicity (Step S51). At this time, the higher the simplicity is, the fewer characters to be entered the simplification unit 163 selects. For example, the storage unit 12 may store a table storing simplicities and the numbers of characters to be entered in association with each other. The simplification unit 163 may determine how many characters the user is prompted to enter, by referring to this table. Alternatively, for example, the storage unit 12 may store a table storing the numbers of characters included in a registered password, simplicities, and the proportions of the characters to be entered in the registered password, in association with each other. The simplification unit 163 may determine how many characters the user is prompted to enter, by referring to this table. Next, the simplification unit 163 selects, from the registered password, the determined number of characters as the characters to be entered by the user (Step S52). At this time, the simplification unit 163 may select the characters, for example, randomly or in accordance with a predetermined criterion. Then, the simplification unit 163 stores, in the storage unit 12, position numbers indicating the positions of the selected characters in association with the login session information (Step S53). After Step S53, the simplification unit 163 terminates the input character determination process.

Figure 9:
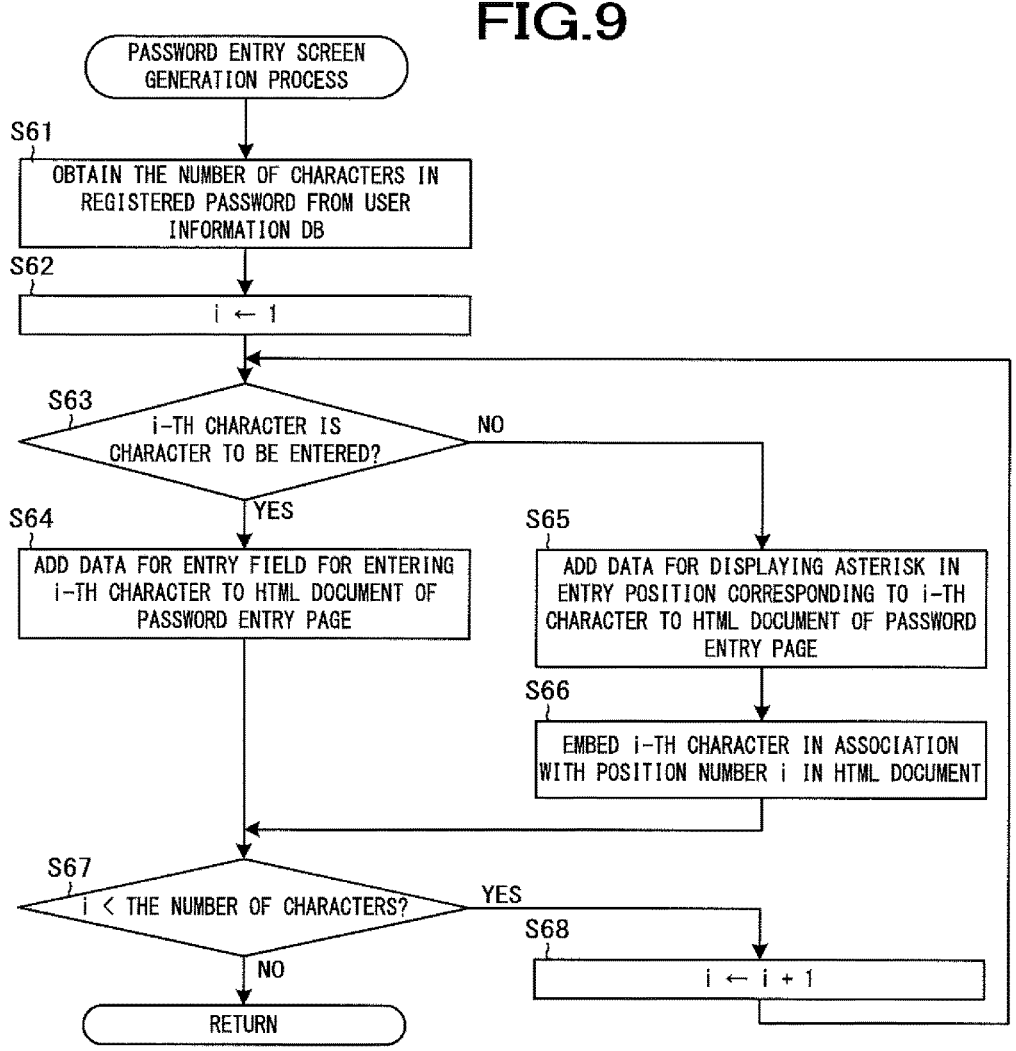
FIG. 9 is a flowchart showing an example of a password entry screen generation process in the system controller 16 of the authentication device 1 according to an embodiment.

FIG. 9 is a flowchart showing an example of the password entry screen generation process in the system controller 16 of the authentication device 1 according to this embodiment. As shown in FIG. 9, the password entry screen output unit 164 obtains the number of characters in the registered password (Step S61). The password entry screen output unit 164 also obtains an HTML document, a template, of the web page for the password entry screen from the storage unit 12. This HTML document includes, for example, a script used by the user terminal 2 for completion of a password. Subsequently, the password entry screen output unit 164 sets a position number i to 1 (Step S62). Then, the password entry screen output unit 164 determines whether the i-th character of the registered password is a character to be entered by the user (Step S63). For example, if the position number equal to i is included among the position numbers stored in association with the login session information, the password entry screen output unit 164 determines that the i-th character is a character to be entered (YES in Step S63). In this case, the password entry screen output unit 164 adds, for example, data for displaying a character entry field for entering the i-th character to the HTML document (Step S64). Then, the password entry screen output unit 164 causes the process to proceed to Step S67. On the other hand, if the password entry screen output unit 164 determines that the i-th character is not a character to be entered (NO in Step S63), the process proceeds to Step S65. In Step S65, the password entry screen output unit 164 adds data for displaying an asterisk at the position corresponding to the i-th character to the HTML document. In addition, the password entry screen output unit 164 embeds the i-th character of the registered password in association with the position number i in the HTML document (Step S66). The character embedded in the HTML document is used for completion of the password. The password entry screen output unit 164 may encrypt the character to be embedded in the HTML document in terms of security. Then, the password entry screen output unit 164 causes the process to proceed to Step S67. In Step S67, the password entry screen output unit 164 determines whether the position number i is less than the number of characters in the registered password. Here, if the password entry screen output unit 164 determines that the position number i is less than the number of characters in the registered password (YES in Step S67), the process proceeds to Step S68. In Step S68, the password entry screen output unit 164 adds 1 to the position number i, and the process proceeds to Step S63. On the other hand, if the password entry screen output unit 164 determines that the position number i is not less than the number of characters in the registered password (NO in Step S67), the password entry screen output unit 164 terminates the password entry screen generation process.

Figure 10A:
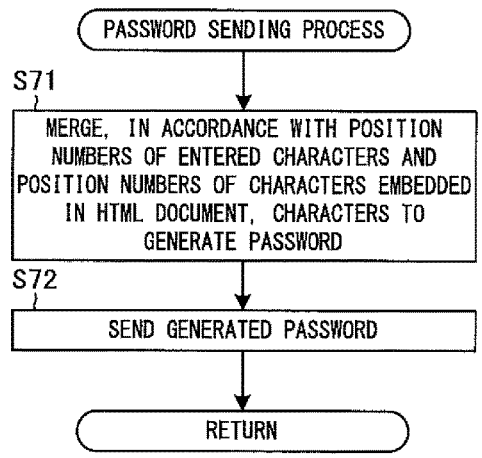
FIG. 10A is a flowchart showing an example of a password sending process in a user terminal 2 according to an embodiment.

FIG. 10A is a flowchart showing an example of a password sending process in the user terminal 2 according to this embodiment. When the user selects the submit button 140 on the password entry screen displayed by the user terminal 2, the user terminal 2 performs the password sending process. As shown in FIG. 10A, the user terminal 2 merges the characters entered in the character entry fields and the characters embedded in the HTML document to generate a password for authentication, in accordance with the position numbers of the characters entered in the character entry fields and the position numbers of the characters embedded in the HTML document (Step S71). Specifically, the user terminal 2 merges the characters in ascending order of their position numbers. Subsequently, the user terminal 2 sends the generated password to the authentication device 1 (Step S72), and terminates the password sending process.

Figure 10B:
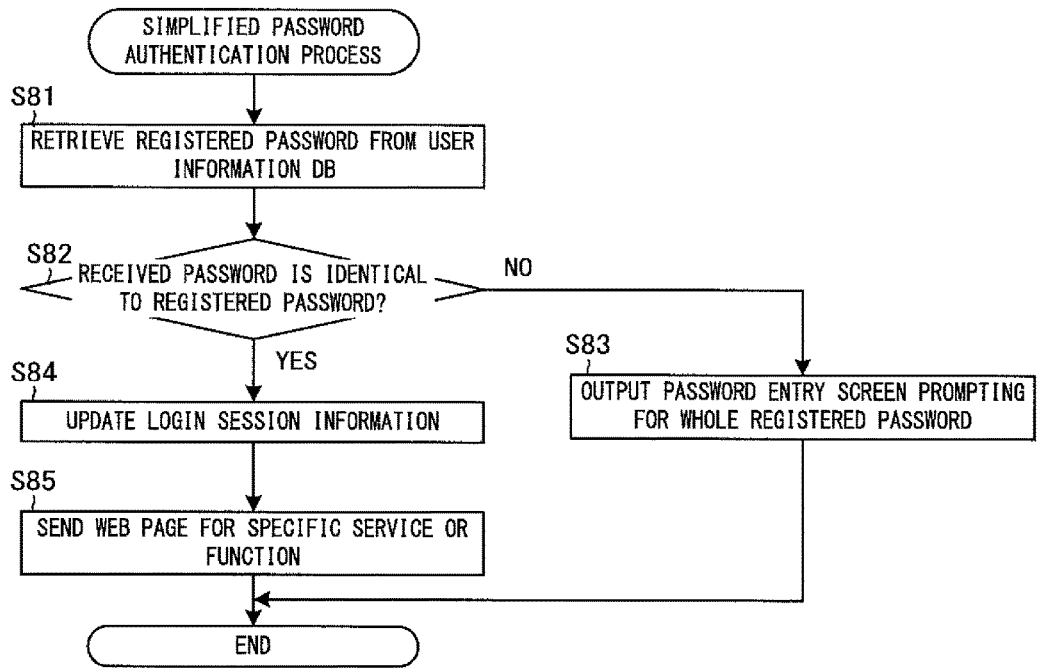
FIG. 10B is a flowchart showing an example of a simplified password authentication process in the system controller 16 of the authentication device 1 according to an embodiment.

FIG. 10B is a flowchart showing an example of a simplified password authentication process in the system controller 16 of the authentication device 1 according to this embodiment. When the password entered on the password entry screen is received from the user terminal 2, the system controller 16 performs the simplified password authentication process. As shown in FIG. 10B, the authentication unit 165 retrieves the registered password from the user information DB 3 (Step S81). Specifically, the authentication unit 165 identifies, from the storage unit 12, the login session information corresponding to the session ID sent together with the password from the user terminal 2. Subsequently, the authentication unit 165 retrieves the registered password corresponding to the user ID included in the login session information. Then, the authentication unit 165 determines whether the received password is identical to the registered password (Step S82). Here, if the authentication unit 165 determines that the passwords are not identical (NO in Step S82), the process proceeds to Step S83. In Step S83, the password entry screen output unit 164 outputs the web page for the password entry screen prompting for the whole registered password to the user terminal 2, and terminates the simplified password authentication process.

On the other hand, if the authentication unit 165 determines that the passwords are identical (YES in Step S82), the process proceeds to Step S84. In Step S84, the authentication unit 165 updates the login session information as needed. For example, the user situation information included in the login session information may be updated with the user situation information indicating the user's current situation (obtained in Step S13 shown in FIG. 6). This update enables the simplification unit 163 to perform the simplification depending on the user's situation at the time of the previous successful authentication and the user's current situation. On the other hand, if not performing such an update, the simplification unit 163 performs the simplification depending on the user's situation at the time of the successful login authentication and the user's current situation. Then, the authentication unit 165 outputs a web page for the specific service or function requested by the user to the user terminal 2 (Step S85). After Step S85, the authentication device 165 terminates the simplified password authentication process.

1-5. Authentication Device Implemented on Terminal Device

Figure 1B:
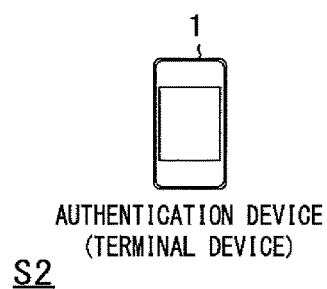
FIG. 1B is a diagram showing an example of a schematic configuration of an information processing system S2 in which the authentication device 1 is implemented on a terminal device.

The following describes the authentication device 1 implemented on a terminal device with reference to FIG. 1B. FIG. 1B is a diagram showing an example of a schematic configuration of an information processing system S2 in which the authentication device 1 is implemented on a terminal device. As shown in FIG. 1B, the information processing system S2 includes the authentication device 1 as a terminal device. The authentication device 1 in this case may be connectable to, for example, a network. Two or more authentication devices 1 may exist. The authentication device 1 may be, for example, a smartphone, a tablet computer, a mobile phone, a personal computer, a PDA, or a STB. The authentication device 1 is used by a user.

The storage unit 12 stores, for example, a user ID and a password preset by the user. This password is the registered password. For example, to use the authentication device 1, the user performs a login operation. At this time, the user enters his or her user ID and password, for example, on the login screen. The authentication device 1 performs authentication of the user by comparing the entered user ID and password with the user ID and the password stored in the storage unit 12. The authentication device 1 implemented on a terminal device may be configured to eliminate the need for entry of the user ID during login. When the authentication of the user succeeds, the login to the authentication device 1 succeeds. While the user logs in to the authentication device 1, the user remains authenticated by the authentication device 1. During this period, for example, when the user attempts to use a specific function of the authentication device 1, the authentication device 1 performs reauthentication of the user.

Processes in the authentication device 1 implemented on a terminal device are basically the same as the processes shown in the flowcharts of FIGS. 5 to 10B. However, the current user situation identification unit 161 identifies, for example, the location of the authentication device 1, the location of the user who uses the authentication device 1, or time, as the user's current situation. Thus, the current user situation identification unit 161 can obtain or generate user situation information in the same way as the user terminal 2. The authentication device 1 does not have to generate and store login session information because basically only one user can log in to the authentication device 1 simultaneously. In this case, the current user situation identification unit 161 has only to store the obtained user situation information in the storage unit 12. The login screen, the password entry screen, and other screens are displayed on the display unit 14. The authentication unit 165 obtains the password entered by the user via input unit 13. The password completion is performed by the authentication unit 165.

As described above, according to this embodiment, the system controller 16 identifies the user's current situation. The system controller 16 also obtains the situation in which the user was placed at the time of the past authentication. When the user is currently authenticated, the system controller 16 simplifies the password to be entered by the user, depending on the current and past situations. The system controller 16 then outputs the web page for the password entry screen prompting for the simplified password. Consequently, this embodiment can simplify a password to be entered by a user while ensuring security.

The system controller 16 may change which part of the password to be originally entered by the user the user is prompted based simplification to enter, depending on the current and past situations. Thus changing which part the user is prompted to enter can change the simplicity. For example, the system controller 16 may change which character type(s) of character(s) the user is prompted to enter. Also for example, the system controller 16 may change how many character types of characters the user is prompted to enter. Also for example, the system controller 16 may change how many characters are to be entered by the user.

The system controller 16 obtains the part not included in the simplified password from the registered password stored in the user information DB 3, and embeds the part in the HTML document of the password entry screen. The system controller 16 also obtains, from the user terminal 2, the password for authentication generated by completing the password entered on the password entry screen with the part embedded in the HTML document. Then, the system controller 16 determines whether authentication of the user succeeds or fails, by comparing the password for authentication with the registered password. Thus, whether the authentication succeeds or fails can be determined based on whether the password for authentication and the registered password are identical or not.

When authentication using the password entered on the password entry screen has failed, the system controller 16 may output the web page for the password entry screen prompting for the whole registered password. In this case, even when the failure of the authentication using the simplified password makes it doubtful whether the person who has entered the simplified password is the authenticated user, security can be ensured.

The system controller 16 may display a symbol, such as an asterisk, for the part included in the registered password but not included in the simplified password. In this case, the symbols, which are viewed by the user, can make the user aware of which part in his or her registered password the user does not have to enter.

2. Second Embodiment

Figure 12:
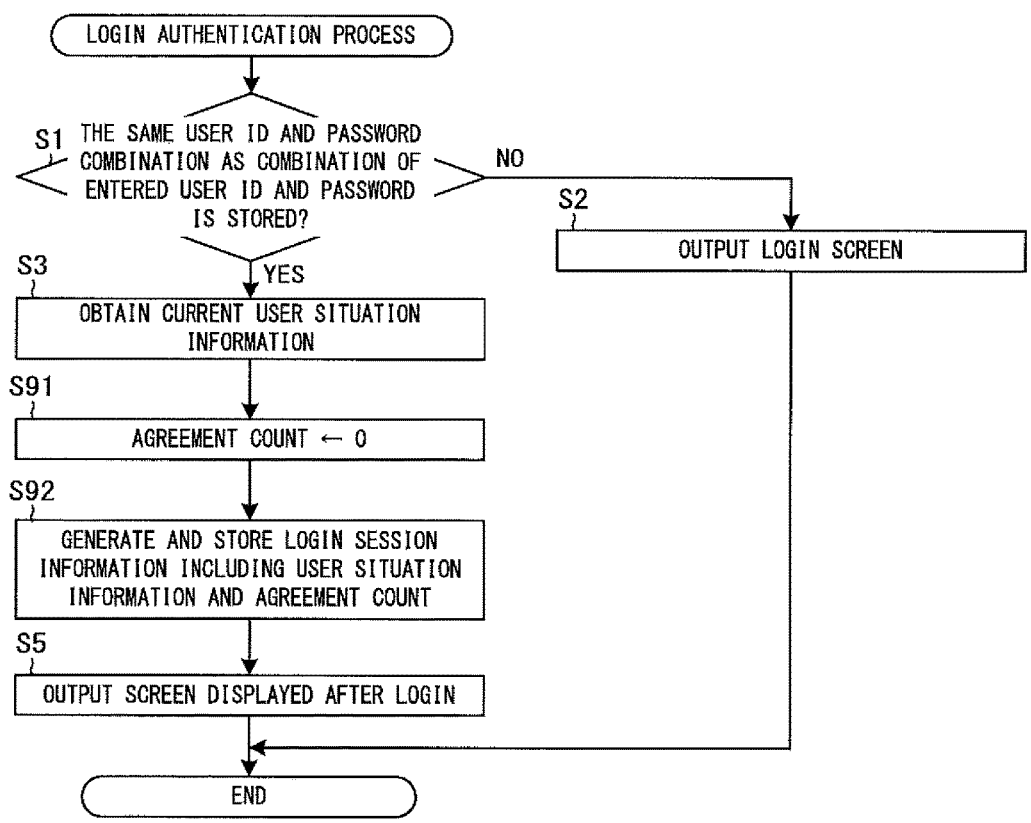
FIG. 12 is a flowchart showing an example of the login authentication process in the system controller 16 of the authentication device 1 according to an embodiment.
Figure 13:
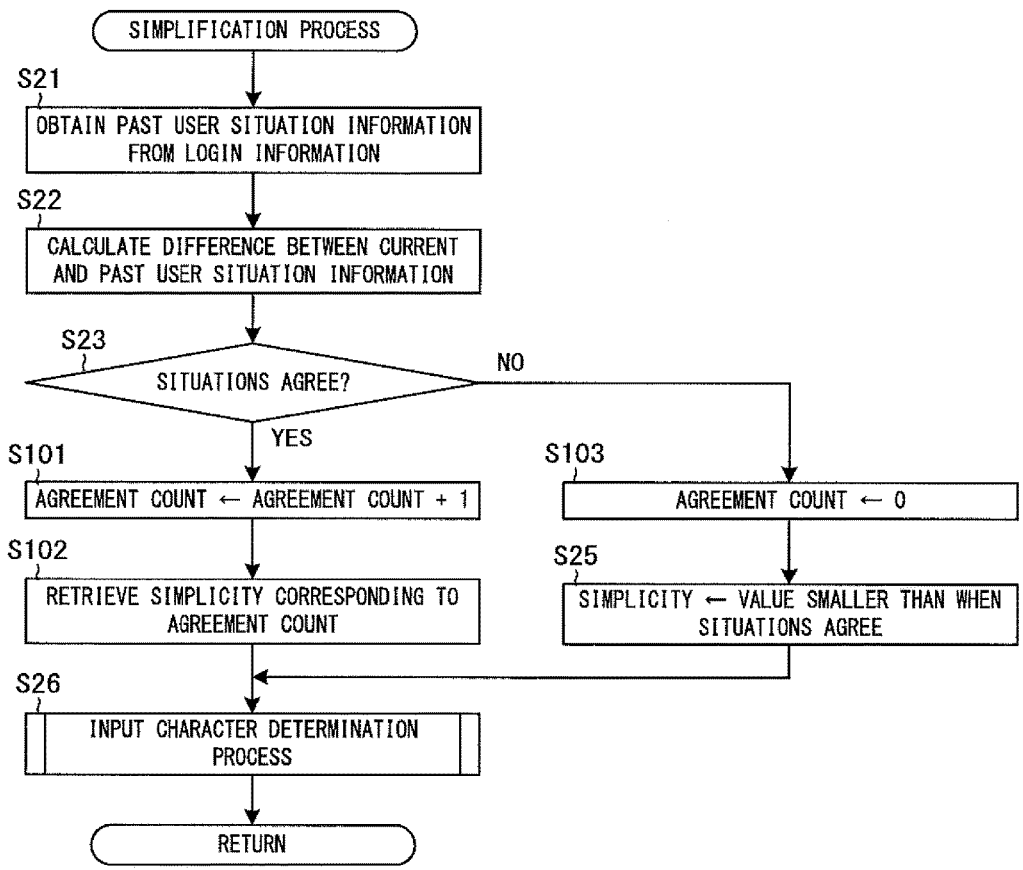
FIG. 13 is a flowchart showing an example of the simplification process in the system controller 16 of the authentication device 1 according to an embodiment.

The following describes a second embodiment with reference to FIGS. 11 to 13. Every time a logged-in user uses a specific service or function, the authentication device 1 performs authentication of the user by using his or her simplified password. In the first embodiment, even when the user's current and past situations continue to agree, the simplicity is left unchanged. In this embodiment, when authentication using the password simplified in response to the case where the situations agree is repeated, the authentication device 1 simplifies the password by generating a password simplified at a simplicity lower than the previous simplicity. Even when the user's current and past situations agree, repeating authentication using the simplified password may tend to reduce security, that is, increase the probability that the person who enters a password is not the authenticated user himself or herself. Thus, when authentication using the password simplified in response to the case where the situations agree is repeated, the simplicity is set lower than previously set to ensure security. Also in this embodiment, the authentication device 1 may be, for example, a server device or a terminal device. Except for points described below, the second embodiment is basically the same as the first embodiment.

FIG. 11 is a diagram showing an example of how to determine the simplicity. As shown in FIG. 11, when the current and past situations agree for the first time, for example, the simplicity may be set to a maximum value. In the example of FIG. 11, the simplicity is 6. As the situations agree two, three, and more times in a row, the simplicity decreases. For example, the simplicity may be decremented by 1. In the example of FIG. 11, when the situations agree five or more times in a row, for example, the simplicity is set to 2. How many times the situations continue to agree is referred to as an agreement count. The simplicity for cases where the current and past situations are different may be lower than the minimum simplicity for cases where the situations agree. In the example of FIG. 11, the simplicity for cases where the situations are different is 1. Alternatively, for example, the simplicity for cases where the current and past situations are different may be identical to the minimum simplicity for cases where the situations agree. The storage unit 12 stores, for example, an agreement count/simplicity conversion table. The agreement count/simplicity conversion table is a table storing agreement counts and simplicities in accordance with each other. The simplification unit 163 may determine the simplicity by referring to this table.

FIG. 12 is a flowchart showing an example of the login authentication process in the system controller 16 of the authentication device 1 according to this embodiment. In FIG. 12, the same steps as those shown in FIG. 5 are denoted by the same reference signs. As shown in FIG. 12, the authentication unit 165 performs Step S2 or S3 based on the determination in Step S1. After Step S3, the simplification unit 163 sets an agreement count to 0 (Step S91). Subsequently, the authentication unit 165 generates login session information including the user situation information and the agreement count and stores it in the storage unit 12 (Step S92). Then, the authentication unit 165 performs Step S5.

FIG. 13 is a flowchart showing an example of the simplification process in the system controller 16 of the authentication device 1 according to this embodiment. In FIG. 13, the same steps as those shown in FIG. 7 are denoted by the same reference signs. As shown in FIG. 13, the system controller 16 performs Steps S21 to S23. In Step S23, if the simplification unit 163 determines that the user's current and past situations agree (YES in Step S23), the process proceeds to Step S101. In Step S101, the simplification unit 163 adds 1 to the agreement count included in the login session information. Subsequently, the simplification unit 163 retrieves the simplicity corresponding to the agreement count from the agreement count/simplicity conversion table (Step S102). Then, the simplification unit 163 performs the input character determination process (Step S26). On the other hand, if the simplification unit 163 determines that the user's current and past situations disagree (NO in Step S23), the process proceeds to Step S103. In Step S103, the simplification unit 163 sets the agreement count included in the login session information to 0. Then, the simplification unit 163 performs Steps S25 and S26.

As described above, according to this embodiment, when authentication using the password simplified in response to the case where the situations agree is repeated, the system controller 16 generates a password simplified at a simplicity lower than the previous simplicity. Consequently, this embodiment can simplify a password to be entered by a user while ensuring security.

3. Third Embodiment

Figure 15:
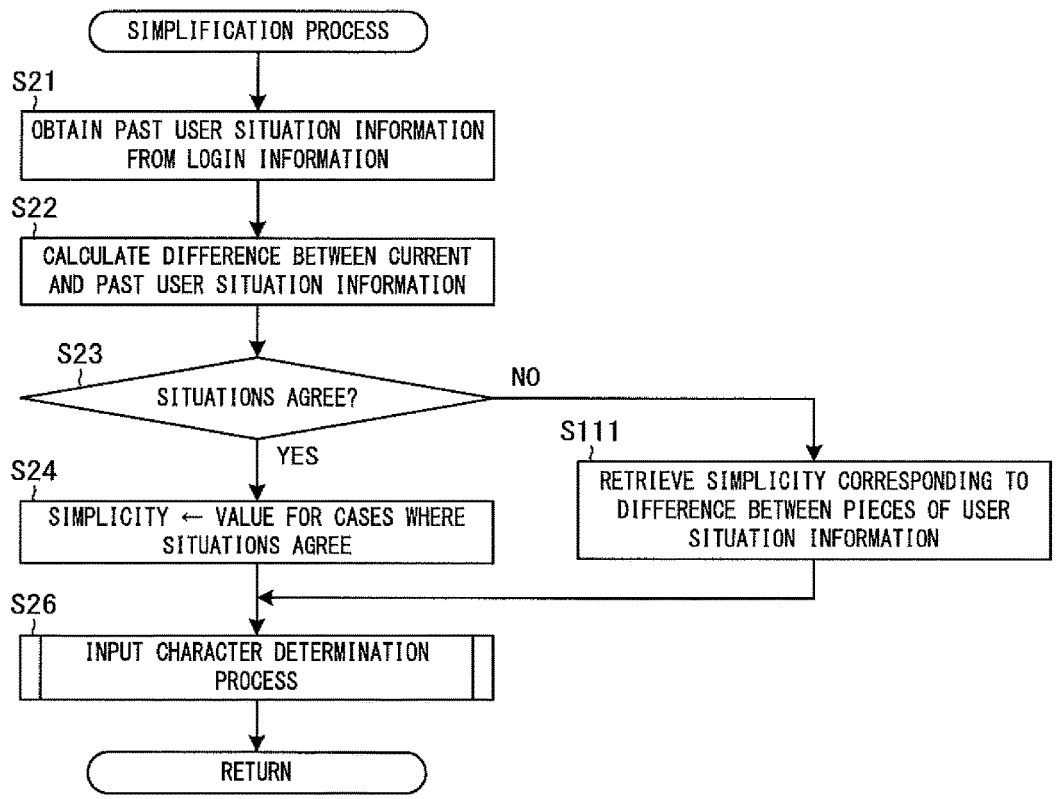
FIG. 15 is a flowchart showing an example of the simplification process in the system controller 16 of the authentication device 1 according to an embodiment.

The following describes a third embodiment with reference to FIGS. 14 and 15. In the first embodiment, when the user's current and past situations are different, the simplicity is left unchanged in any case. In this embodiment, the greater the difference between the user's current and past situations is, the lower the authentication device 1 sets the simplicity The greater the difference between the current and past situations is, the lower the security will become, that is, the higher the probability that the person who enters a password is not the authenticated user himself or herself will become. Thus, the greater the difference between the current and past situations is, the lower the simplicity is set to ensure security. Also in this embodiment, the authentication device 1 may be, for example, a server device or a terminal device. Except for points described below, the third embodiment is basically the same as the first or second embodiment.

FIG. 14 is a diagram showing an example of how to determine the simplicity. As shown in FIG. 14, the simplicity is determined depending on the difference between the situations. In FIG. 14, when the difference between the situations is Level 0, that is, when the current and past situations agree, the simplicity is 6. When the difference between the situations is Level 1 or above, this means that the current and past situations are different. When the difference between the situations is level 1, the simplicity is 5. As the difference between the situations increases, the simplicity decreases. When the difference between the situations is Level 5 or above, the simplicity is 1. The simplicity for cases where the situations are different may be the minimum 0. The simplicity 0 means that the password is not simplified. That is, the user has to his or her whole registered password. For convenience of explanation, in the example of FIG. 14, each Level indicates a difference between the situations, and a simplicity is shown for each Level. In practice, a simplicity is defined, for example, for each distance range or for each time range. For example, the simplicity may be set to 6 if the distance between the current and past positions is shorter than 5 m, the simplicity may be set to 5 if the distance is 5 m or longer and shorter than 20 m, and the simplicity may be set to 4 if the distance is 20 m or longer and shorter than 50 m. The storage unit 12 stores, for example, a situation difference/simplicity conversion table. The situation difference/simplicity conversion table is a table storing situation differences and simplicities in accordance with each other. The simplification unit 163 may determine the simplicity by referring to this table.

When the current and past situations are different, the greater the difference between the situations is, the lower the simplification unit 163 may set the simplicity. On the other hand, when the current and past situations agree, the simplification unit 163 may set the simplicity lower than the previous simplicity every time the situations continue to agree, as in the second embodiment. In this case, for example, the maximum simplicity for cases where the situations agree may be higher than the maximum simplicity for cases where the situations are different.

FIG. 15 is a flowchart showing an example of the simplification process in the system controller 16 of the authentication device 1 according to this embodiment. In FIG. 15, the same steps as those shown in FIG. 7 are denoted by the same reference signs. As shown in FIG. 15, the system controller 16 performs Steps S21 to S23. In Step S23, if the simplification unit 163 determines that the user's current and past situations agree (YES in Step S23), the simplification unit 163 performs Steps S24 and S26. On the other hand, if the simplification unit 163 determines that the user's current and past situations disagree (NO in Step S23), the process proceeds to Step S111. In Step S111, the simplification unit 163 retrieves the simplicity corresponding to the difference between the pieces of user situation information calculated in Step S22 from the situation difference/simplicity conversion table. Then, the simplification unit 163 performs the input character determination process (Step S26).

As described above, according to this embodiment, the greater the difference between the current and past situations is, the less simplified password the system controller 16 generates. Consequently, this embodiment can simplify a password to be entered by a user while ensuring security.

4. Fourth Embodiment

The following describes a fourth embodiment with reference to FIGS. 16A to 18. In this embodiment, every time authentication using the password simplified in response to a case where the user's current and past situations are different is repeated, the authentication device 1 sets the situation difference, which allows the simplicity to be set equal to the previous simplicity, smaller than previously set. When the user's current situation are different from his or her past situation, repeating authentication using the simplified password may tend to reduce security. Thus, the authentication device 1 decreases the situation difference, which allows a password to be simplified at the same simplicity as the past simplicity, to ensure security. For example, at the time of authentication, when the current and past situations are different for the first time, the simplicity may be set to 5 if the difference between the current and past times is less than an hour. When the current and past situations are different twice in a row, for example, the simplicity may be set to 5 if the difference between the current and past times is less than thirty minutes, and the simplicity may be set to 4 if the difference between the times is thirty minutes or more and less than an hour. Also in this embodiment, the authentication device 1 may be, for example, a server device or a terminal device. Except for points described below, the forth embodiment is basically the same as the fifth embodiment.

FIGS. 16A to 16C are each a diagram showing an example of how to determine the simplicity. FIG. 16A shows an example of how to determine the simplicity when the current and past situations are different for the first time. When the situations are different for the first time, for example, as shown in FIG. 16A, the simplicity is set to 5 if the situation difference is Level 1 or above and Level 4 or below, and the simplicity is set to 4 if the situation difference is Level 5 or above and Level 8 or below. Similarly, after that, the simplicity decreases with every increase by 4 in the situation difference. FIG. 16B shows an example of how to determine the simplicity when the current and past situations are different twice in a row. When the situations are different twice in a row, for example, as shown in FIG. 16B, the simplicity is set to 5 if the situation difference is Level 1 or above and Level 2 or below, and the simplicity is set to 4 if the situation difference is Level 3 or above and Level 4 or below. Similarly, after that, the simplicity decreases with every increase by 2 in the situation difference. FIG. 16C shows an example of how to determine the simplicity when the current and past situations are different three times in a row. When the situations are different three times in a row, for example, as shown in FIG. 16C, the simplicity is set to 5 if the situation difference is Level 1, and the simplicity is set to 4 if the situation difference is Level 2. Similarly, after that, the simplicity decreases with every increase by 1 in the situation difference. How many times the situations remain different is referred to as a disagreement count. The storage unit stores, for example, a plurality of situation difference/simplicity conversion tables. Each of the situation difference/simplicity conversion tables is stored in association with a disagreement count. The simplification unit 163 may select one of the situation difference/simplicity conversion tables based on the disagreement count and determine the simplicity by referring to the selected table.

Figure 17:
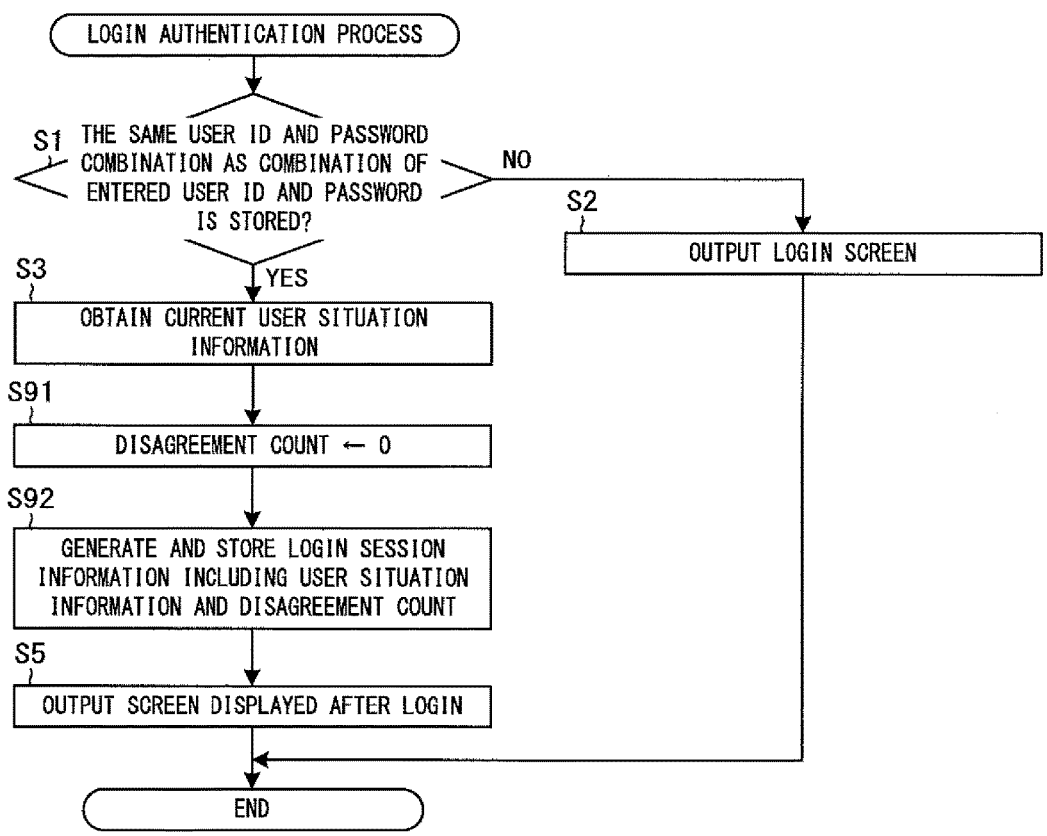
FIG. 17 is a flowchart showing an example of the login authentication process in the system controller 16 of the authentication device 1 according to an embodiment.

FIG. 17 is a flowchart showing an example of the login authentication process in the system controller 16 of the authentication device 1 according to this embodiment. In FIG. 17, the same steps as those shown in FIG. 5 are denoted by the same reference signs. As shown in FIG. 17, the authentication unit 165 performs Step S2 or S3 based on the determination in Step S1. After Step S3, the simplification unit 163 sets a disagreement count to 0 (Step S121). Subsequently, the authentication unit 165 generates login session information including the user situation information and the disagreement count, and stores it in the storage unit 12 (Step S122). Then, the authentication unit 165 performs Step S5.

Figure 18:
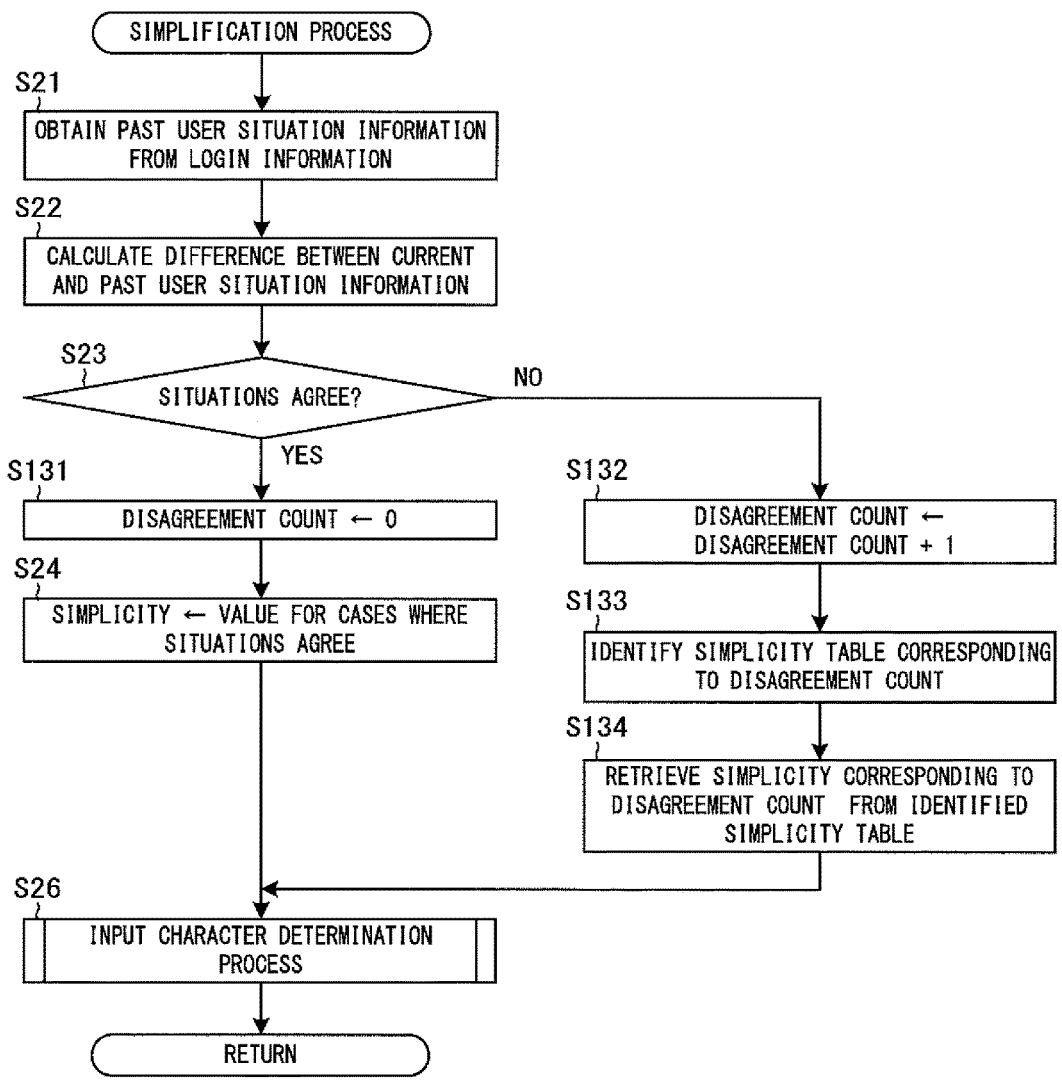
FIG. 18 is a flowchart showing an example of the simplification process in the system controller 16 of the authentication device 1 according to an embodiment.

FIG. 18 is a flowchart showing an example of the simplification process in the system controller 16 of the authentication device 1 according to this embodiment. In FIG. 18, the same steps as those shown in FIG. 7 are denoted by the same reference signs. As shown in FIG. 18, the system controller 16 performs Steps S21 to S23. In Step S23, if the simplification unit 163 determines that the user's current and past situations agree (YES in Step S23), the process proceeds to Step S131. In Step S131, the simplification unit 163 sets the disagreement count included in the login session information to 0. Then, the simplification unit 163 performs Steps S24 and S26. On the other hand, if the simplification unit 163 determines that the user's current and past situations disagree (NO in Step S23), the process proceeds to Step S132. In Step S132, the simplification unit 163 adds 1 to the disagreement count included in the login session information. Next, the simplification unit 163 identifies the situation difference/simplicity conversion table corresponding to the disagreement count by referring to the storage unit 12 (Step S133). Subsequently, the simplification unit 163 retrieves the simplicity corresponding to the difference between the pieces of user situation information calculated in Step S22 from the situation difference/simplicity conversion table identified in Step S133 (Step S134). Then, the simplification unit 163 performs the input character determination process (Step S26).

As described above, according to this embodiment, every time authentication using the password simplified in response to a case where the situations are different is repeated, the system controller 16 decreases the situation difference, which allows the password to be simplified at the same simplicity as the previous simplicity. Consequently, this embodiment can simplify a password to be entered by a user while ensuring security.

5. Fifth Embodiment

Figure 19:
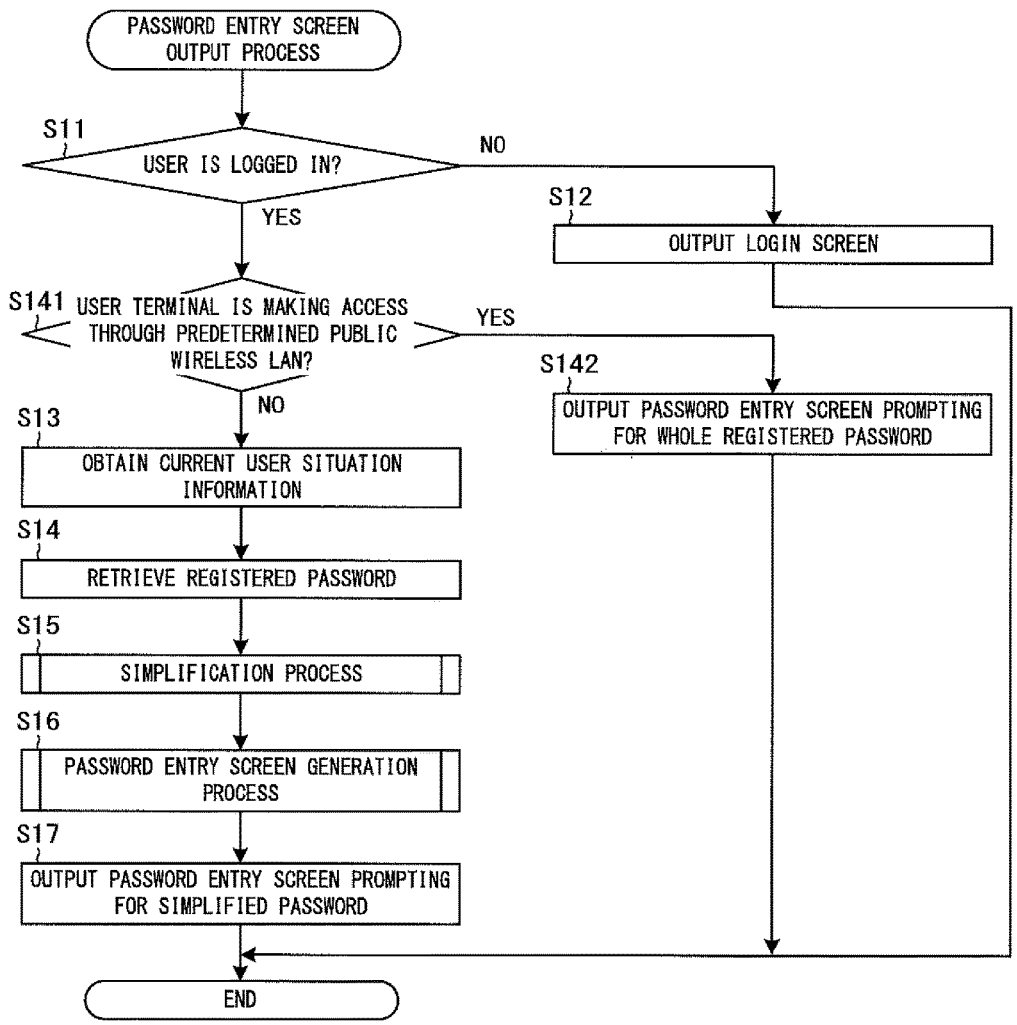
FIG. 19 is a flowchart showing an example of the password entry screen output process in the system controller 16 of the authentication device 1 according to an embodiment.

The following describes a fifth embodiment with reference to FIG. 19. In this embodiment, the authentication device 1 does not simplify the password when the user's current situation does not meet predetermined requirements for security. The user may be currently in a low-security situation regardless of his or her past situation. In such a case, the authentication device 1 prompts the user to enter his or her whole registered password to ensure security. Also in this embodiment, the authentication device 1 may be, for example, a server device or a terminal device. Except for points described below, the fifth embodiment is basically the same as the first to fourth embodiments.

Examples of situations that do not meet the requirements for security include a case where the user terminal 2 is accessing a public wireless LAN requiring no registration or available free of charge for connection, and a case where the user terminal 2 is accessing a public wireless LAN requiring no authentication to use it. Such cases increase the probability that a person other than the user himself or herself authenticated by the authentication device 1 uses the authentication device 1. For example, in such cases, the simplification unit 163 may not simplify the password.

FIG. 19 is a flowchart showing an example of the password entry screen output process in the system controller 16 of the authentication device 1 according to this embodiment. In FIG. 19, the same steps as those shown in FIG. 6 are denoted by the same reference signs. As shown in FIG. 19, the authentication unit 165 performs Step S12 or S13 based on the determination in Step S11. In Step S13, the current user situation identification unit 161 obtains at least the IP address assigned to the user terminal 2 from the request from the user terminal 2 as user situation information indicating the user's current situation. Subsequently, the simplification unit 163 determines whether the user terminal 2 is making access through a public wireless LAN not meeting the predetermined requirements for security, based on the obtained IP address (Step S141). For example, the storage unit 12 may store a list of the IP addresses of public wireless LANs not meeting the requirements for security. If the obtained IP address is included in the list, the simplification unit 163 may determine that the user terminal 2 is making access through a public wireless LAN not meeting the requirements for security (YES in Step S141). In this case, the password entry screen output unit 164 outputs the web page for the password entry screen prompting for the whole registered password to the user terminal 2 (Step S142), and terminates the password entry screen output process. On the other hand, if the simplification unit 163 determines that the user terminal 2 is not making access through a public wireless LAN not meeting the requirements for security (NO in Step S141), the process proceeds to Step S14. Then, the system controller 16 performs Steps S14 to S17.

As described above, according to this embodiment, the system controller 16 does not simplify the password when the current situation does not meet the predetermined requirements for security. Consequently, this embodiment can ensure security.

6. Sixth Embodiment

Figure 20:
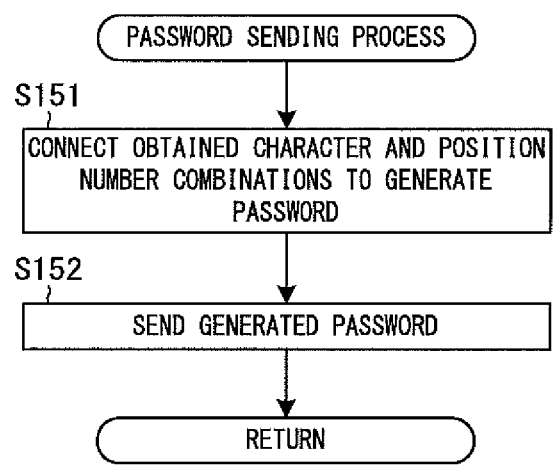
FIG. 20 is a flowchart showing an example of the password sending process in the user terminal 2 according to an embodiment.
Figure 21:
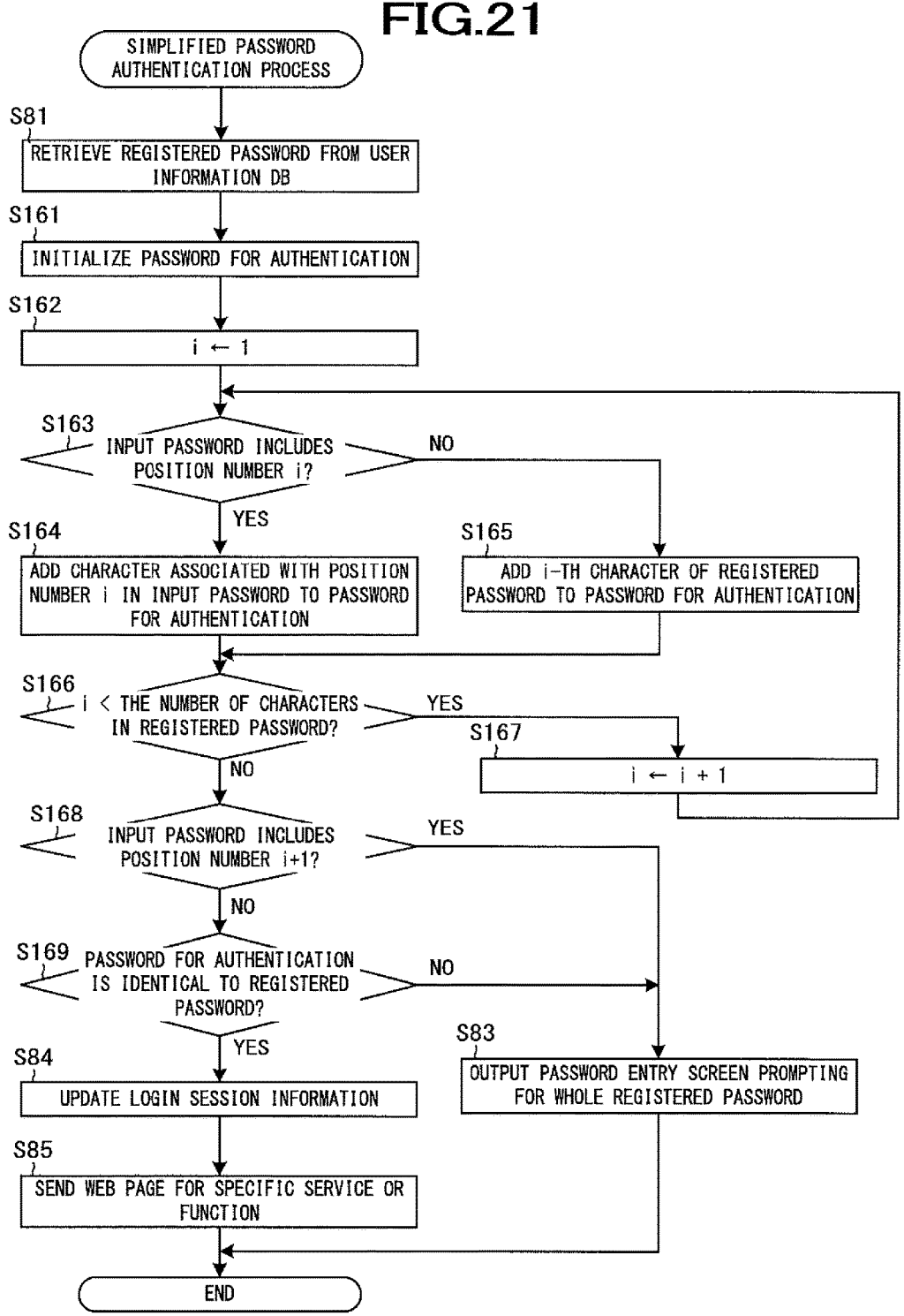
FIG. 21 is a flowchart showing an example of the simplified password authentication process in the system controller 16 of the authentication device 1 according to an embodiment.

The following describes a sixth embodiment with reference to FIGS. 20 and 21. In the first embodiment, the user terminal 2 performs the password completion. In this embodiment, the user terminal 2 sends only the characters entered by a user on the password entry screen to the authentication device 1. Then, the authentication device 1 performs the password completion. Except for points described below, the sixth embodiment is basically the same as the first to fifth embodiments.

FIG. 20 is a flowchart showing an example of the password sending process in the user terminal 2 according to this embodiment. When a user selects the submit button 140 on the password entry screen displayed by the user terminal 2, the user terminal 2 performs the password sending process. As shown in FIG. 20, the user terminal 2 obtains, for each character entry field, a combination of the character entered in the character entry field and the position number corresponding to the character entry field. When no character is entered in a character entry field, the user terminal 2 combines the position number of the character entry field and, for example, a blank character. Then, the user terminal 2 connects the obtained combinations to generate an input password (Step S151). Next, the user terminal 2 sends the generated input password to the authentication device 1 (Step S152), and terminates the password sending process.

FIG. 21 is a flowchart showing an example of the simplified password authentication process in the system controller 16 of the authentication device 1 according to this embodiment. In FIG. 21, the same steps as those shown in FIG. 10B are denoted by the same reference signs. As shown in FIG. 21, the authentication unit 165 retrieves the registered password from the user information DB 3 (Step S81). Subsequently, the authentication unit 165 initializes a password for authentication (Step S161). Next, the authentication unit 165 sets a position number i to 1 (Step S162). Then, the authentication unit 165 determines whether the input password received from the user terminal 2 includes the position number i (Step S163). Here, if the authentication unit 165 determines that the input password includes the position number i (YES in Step S163), the process proceeds to Step S164. In Step S164, the authentication unit 165 obtains the character associated with the position number i from the input password. Then, the authentication unit 165 adds the obtained character to the password for authentication, and the process proceeds to Step S166. On the other hand, if the authentication unit 165 determines that the input password does not include the position number i (NO in Step S163), the process proceeds to Step S165. In Step S165, the authentication unit 165 obtains the i-th character of the registered password. Then, the authentication unit 165 adds the obtained character to the password for authentication, and the process proceeds to Step S166. In Step S166, the authentication unit 165 determines whether the position number i is less than the number of characters in the registered password. Here, if the authentication unit 165 determines that the position number i is less than the number of characters in the registered password (YES in Step S166), the process proceeds to Step S167. In Step S167, the authentication unit 165 adds 1 to the position number i, and the process proceeds to Step S163. On the other hand, if the authentication unit 165 determines that the position number i is not less than the number of characters in the registered password (NO in Step S166), the process proceeds to Step S168.

In Step S168, the authentication unit 165 determines whether the input password includes the position number i+1 or above. Here, if the authentication unit 165 determines that the input password includes the position number i+1 or above (YES in Step S168), the process proceeds to Step S83. In Step S83, the password entry screen output unit 164 outputs the web page for the password entry screen prompting for the whole registered password to the user terminal 2, and terminates the simplified password authentication process. On the other hand, if the authentication unit 165 determines that the input password does not include the position number i+1 or above (NO in Step S168), the process proceeds to Step S169. In Step S169, the authentication unit 165 determines whether the password for authentication is identical to the registered password. Here, if the authentication unit 165 determines that the password for authentication is not identical to the registered password (NO in Step S169), the process proceeds to Step S83. On the other hand, if the authentication unit 165 determines that the password for authentication is identical to the registered password (YES in Step S169), the authentication unit 165 performs Steps S84 and S85. The authentication unit 165 thus outputs the web page for the specific service or function requested by the user to the user terminal 2.

As described above, according to this embodiment, the system controller 16 obtains the part not included in the simplified password from the registered password stored in the user information DB 3. The system controller 16 completes the entered password with the obtained part to generate and obtain a password for authentication. Then, the system controller 16 determines whether authentication of the user succeeds or fails, by comparing the password for authentication with the registered password. Thus, whether the authentication succeeds or fails can be determined based on whether the password for authentication and the registered password are identical or not.

7. Seventh Embodiment

Figure 22:
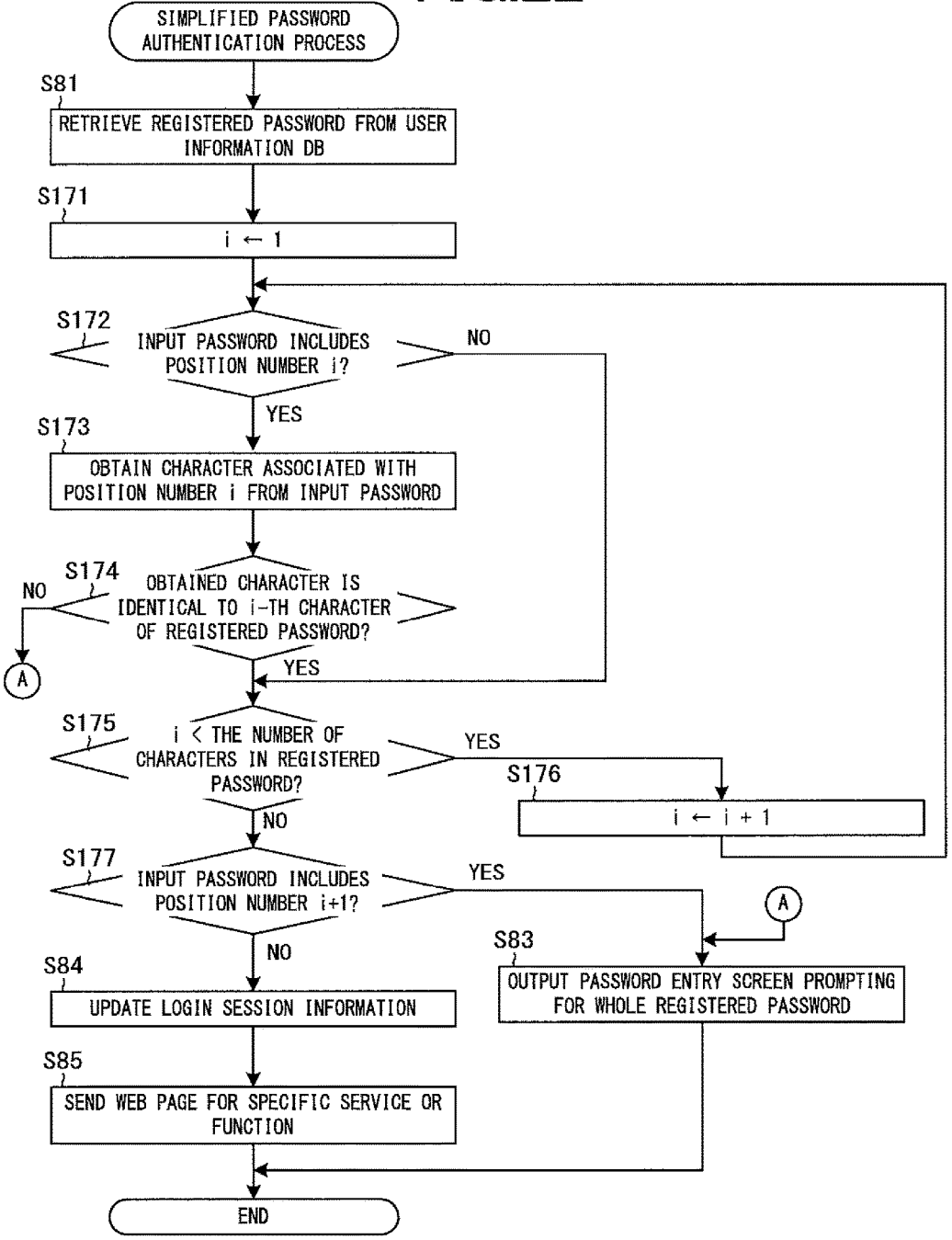
FIG. 22 is a flowchart showing an example of the simplified password authentication process in the system controller 16 of the authentication device 1 according to an embodiment.

The following describes a seventh embodiment with reference to FIG. 22. In this embodiment, neither the authentication device 1 nor the user terminal 2 performs the password completion. The authentication device 1 identifies which positions in the registered password the characters included in the simplified password are found at. Then, the authentication device 1 determines whether authentication of the user succeeds or fails, by comparing the characters included in the password entered by the user with the characters at the identified positions in the registered password. Also in this embodiment, the authentication device 1 may be, for example, a server device or a terminal device. Except for points described below, the seventh embodiment is basically the same as the first to fifth embodiments.

A process in which the user terminal 2 sends the characters entered by the user on the password entry screen to the authentication device 1 may be, for example, the same as the password sending process shown in FIG. 20. The authentication device 1 can identify the positions of the characters included in the simplified password, based on the position numbers included in the input password.

FIG. 22 is a flowchart showing an example of the simplified password authentication process in the system controller 16 of the authentication device 1 according to this embodiment. In FIG. 22, the same steps as those shown in FIG. 10B are denoted by the same reference signs. As shown in FIG. 22, the authentication unit 165 retrieves the registered password from the user information DB 3 (Step S81). Subsequently, the authentication unit 165 sets a position number i to 1 (Step S171). Then, the authentication unit 165 determines whether the input password received from the user terminal 2 includes the position number i (Step S172). Here, if the authentication unit 165 determines that the input password does not include the position number i (NO in Step S172), the process proceeds to Step S175. On the other hand, if the authentication unit 165 determines that the input password includes the position number i (YES in Step S172), the process proceeds to Step S173. In Step S173, the authentication unit 165 obtains the character associated with the position number i from the input password. Then, the authentication unit 165 determines whether the obtained character is identical to the i-th character of the registered password (Step S174). Here, if the authentication unit 165 determines that the obtained character is not identical to the i-th character of the registered password (NO in Step S174), the process proceeds to Step S83. In Step S83, the password entry screen output unit 164 outputs the web page for the password entry screen prompting for the whole registered password to the user terminal 2, and terminates the simplified password authentication process. On the other hand, if the authentication unit 165 determines that the obtained character is identical to the i-th character of the registered password (YES in Step S174), the process proceeds to Step S175.

In Step S175, the authentication unit 165 determines whether the position number i is less than the number of characters in the registered password. Here, if the authentication unit 165 determines that the position number i is less than the number of characters in the registered password (YES in Step S175), the process proceeds to Step S176. In Step S176, the authentication unit 165 adds 1 to the position number i, and the process proceeds to Step S172. On the other hand, if the authentication unit 165 determines that the position number i is not less than the number of characters in the registered password (NO in Step S175), the process proceeds to Step S177. In Step S177, the authentication unit 165 determines whether the input password includes the position number i+1 or above. Here, if the authentication unit 165 determines that the input password includes the position number i+1 or above (YES in Step S177), the process proceeds to Step S83. On the other hand, if the authentication unit 165 determines that the input password does not include the position number i+1 or above (NO in Step S177), the authentication unit 165 performs Steps S84 and S85. The authentication unit 165 thus outputs the web page for the specific service or function requested by the user to the user terminal 2.

As described above, according to this embodiment, the system controller 16 identifies which positions in the registered password stored in the user information DB 3 the simplified password is found at. The system controller 16 then determines whether authentication of the user succeeds or fails, by comparing the entered password with the part at the identified positions in the registered password. Thus, whether the authentication succeeds or fails can be determined without completing the password entered by the user with any information.

8. Eighth Embodiment

The following describes an eighth embodiment with reference to FIGS. 23 to 27. In this embodiment, when a logged-in user attempts to use a specific service or function, the authentication device 1 prompts the user to enter his or her user ID and password. Then, the authentication device 1 performs authentication of the user by comparing the entered user ID and password with his or her registered user ID and password. At this time, the authentication device 1 simplifies the user ID to be entered by the user. The user ID is an example of the authentication information of the present invention. The authentication device 1 may simplify both the user ID and the password, or simplify only the user ID. For example, when the user's e-mail address is used as the user ID, the authentication device 1 may simplify the user ID to be entered by the user into the account name, which is the part before the at sign in the e-mail address. Alternatively, for example, the authentication device 1 may simplify the user ID in such a way as described in the above embodiments. Also in this embodiment, the authentication device 1 may be, for example, a server device or a terminal device. Except for points described below, the eighth embodiment is basically the same as the first to seventh embodiments.

Figure 23:
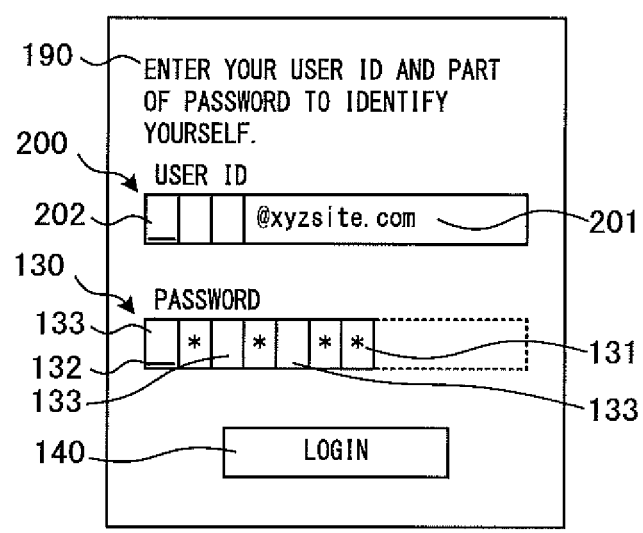
FIG. 23 is a diagram showing a display example of the password entry screen.

FIG. 23 is a diagram showing a display example of the password entry screen. The password entry screen displays a message 190, a user ID entry field 200, the password entry field 130, and the submit button 140. The message 190 is a message prompting for the simplified user ID and the simplified password. In the user ID entry field 200, non-input characters 201 are displayed. The non-input characters 201 are characters, included in the user ID, which the user does not have to enter. Instead of the non-input characters 201, symbols such as asterisks may be displayed. In the user ID entry field 200, one or more character entry fields 202 are also displayed. Each character entry field 202 is an entry field for entering one character in the simplified user ID. In the example of FIG. 23, the character entry fields 202 for entering the first three characters of a user ID are displayed.

Figure 24:
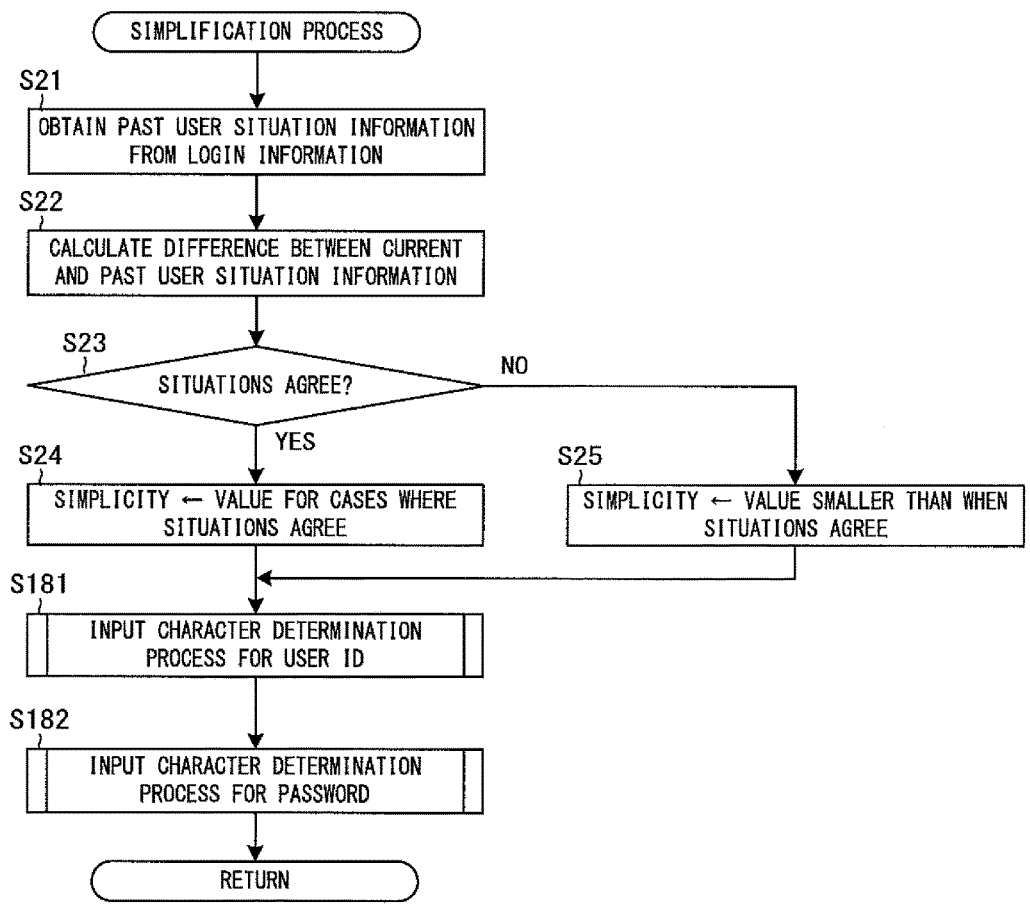
FIG. 24 is a flowchart showing an example of the simplification process in the system controller 16 of the authentication device 1 according to an embodiment.

FIG. 24 is a flowchart showing an example of the simplification process in the system controller 16 of the authentication device 1 according to this embodiment. In FIG. 24, the same steps as those shown in FIG. 7 are denoted by the same reference signs. As shown in FIG. 24, the simplification unit 163 performs Steps S21 to S23, and then performs Step S24 or S25. Subsequently, the simplification unit 163 performs the input character determination process for determining which part of the user ID the user is prompted to enter (Step S181). The input character determination process in this case may be, for example, the same as the process shown in FIGS. 8A to 8C. Then, the simplification unit 163 performs the input character determination process for determining which part of the registered password the user is prompted to enter (Step S182). After Step S182, the simplification unit 163 terminates the simplification process.

Figure 25:
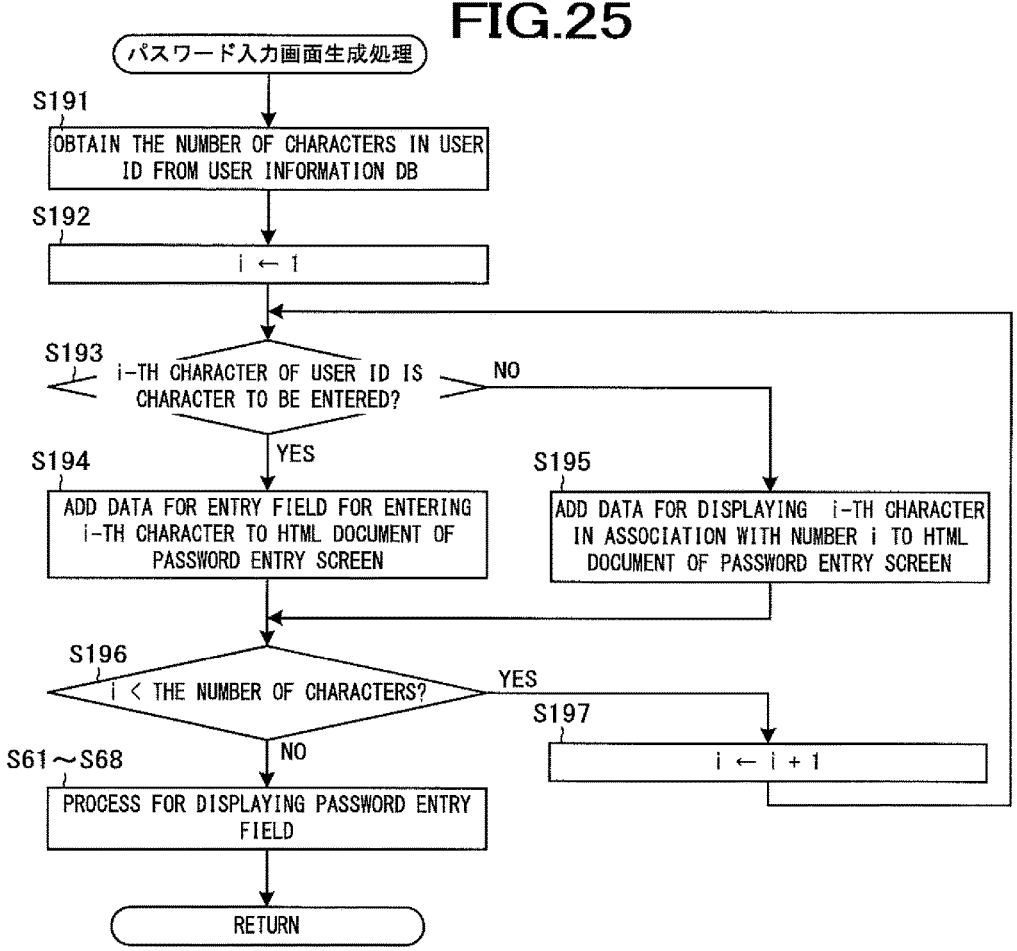
FIG. 25 is a flowchart showing an example of the password entry screen generation process in the system controller 16 of the authentication device 1 according to an embodiment.

FIG. 25 is a flowchart showing an example of the password entry screen generation process in the system controller 16 of the authentication device 1 according to this embodiment. In FIG. 25, the same steps as those shown in FIG. 9 are denoted by the same reference signs. As shown in FIG. 25, the password entry screen output unit 164 obtains the number of characters in the user ID included in the login session information (Step S191). The password entry screen output unit 164 also obtains an HTML document, a template, of the web page for the password entry screen from the storage unit 12. This HTML document includes, for example, a script used by the user terminal 2 for completion of a user ID and a password. Subsequently, the password entry screen output unit 164 sets a position number i to 1 (Step S192). Then, the password entry screen output unit 164 determines whether the i-th character of the user ID is a character to be entered by the user (Step S193). Here, if the password entry screen output unit 164 determines that the i-th character is a character to be entered (YES in Step S193), the process proceeds to Step S194. In Step S194, the password entry screen output unit 164 adds, for example, data for displaying a character entry field for entering the i-th character of the user ID to the HTML document. Then, the password entry screen output unit 164 causes the process to proceed to Step S196. On the other hand, if the password entry screen output unit 164 determines that the i-th character is not a character to be entered (NO in Step S193), the process proceeds to Step S195. In Step S195, the password entry screen output unit 164 adds the i-th character in association with the position number i to the HTML document to display the i-th character. Then, the password entry screen output unit 164 causes the process to proceed to Step S196. In Step S196, the password entry screen output unit 164 determines whether the position number i is less than the number of characters in the user ID. Here, if the password entry screen output unit 164 determines that the position number i is less than the number of characters in the user ID (YES in Step S196), the process proceeds to Step S197. In Step S197, the password entry screen output unit 164 adds 1 to the position number i, and the process proceeds to Step S193. On the other hand, if the password entry screen output unit 164 determines that the position number i is not less than the number of characters in the user ID (NO in Step S196), the password entry screen output unit 164 performs Steps S61 to S68, for example, as in the first embodiment.

Figure 26:
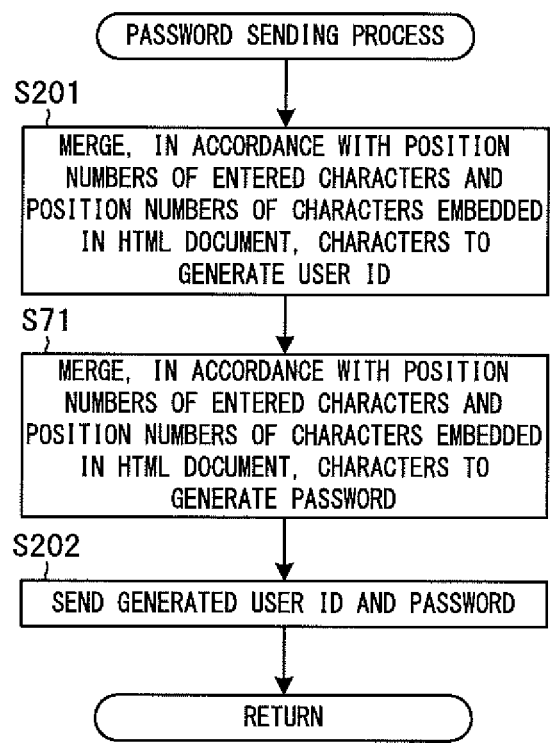
FIG. 26 is a flowchart showing an example of the password sending process in the user terminal 2 according to an embodiment.

FIG. 26 is a flowchart showing an example of the password sending process in the user terminal 2 according to this embodiment. In FIG. 26, the same steps as those shown in FIG. 10A are denoted by the same reference signs. As shown in FIG. 26, the user terminal 2 merges, in accordance with the position numbers of the characters entered in the character entry fields in the user ID entry field and the position numbers of the characters added to the HTML document, the characters entered in the character entry fields and the characters added to the HTML document to generate a user ID for authentication (Step S201). Subsequently, the user terminal 2 generates a password for authentication (Step S71). Then, the user terminal 2 sends the generated user ID and password to the authentication device 1 (Step S202), and terminates the password sending process.

Figure 27:
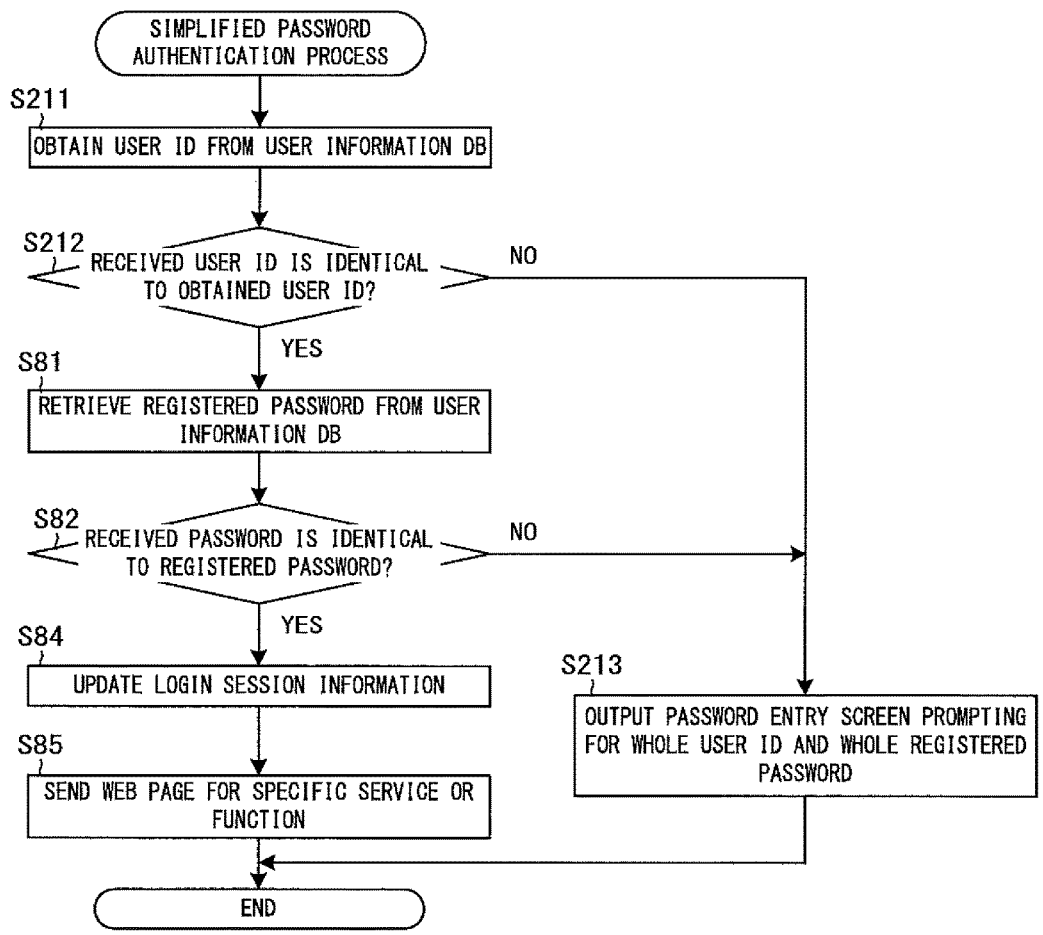
FIG. 27 is a flowchart showing an example of the simplified password authentication process in the system controller 16 of the authentication device 1 according to an embodiment.

FIG. 27 is a flowchart showing an example of the simplified password authentication process in the system controller 16 of the authentication device 1 according to this embodiment. In FIG. 27, the same steps as those shown in FIG. 10B are denoted by the same reference signs. As shown in FIG. 27, the authentication unit 165 obtains the user ID from the login session information corresponding to the session ID sent together with the user ID and the password from the user terminal 2 (Step S211). Subsequently, the authentication unit 165 determines whether the received user ID is identical to the obtained user ID (Step S212). Here, if the authentication unit 165 determines that the user IDs are not identical (NO in Step S212), the process proceeds to Step S213. In Step S213, the password entry screen output unit 164 outputs a web page for a password entry screen prompting for the whole user ID and the whole registered password to the user terminal 2, and terminates the simplified password authentication process. On the other hand, if the authentication unit 165 determines that the user IDs are identical (YES in Step S212), the process proceeds to Step S81.

In Step S81, the authentication unit 165 retrieves the registered password from the user information DB 3. Then, the authentication unit 165 determines whether the received password is identical to the registered password (Step S82). Here, if the authentication unit 165 determines that the passwords are not identical (NO in Step S82), the process proceeds to Step S213. On the other hand, if the authentication unit 165 determines that the passwords are identical (YES in Step S82), the process proceeds to Step S84. In Step S84, the authentication unit 165 updates the login session information as needed. Then, the authentication unit 165 outputs the web page for the specific service or function requested by the user to the user terminal 2 (Step S85). After Step S85, the authentication device 165 terminates the simplified password authentication process.

As described above, according to this embodiment, the system controller 16 simplifies the user ID to be entered by the user, and outputs the web page for the password entry screen prompting for the simplified user ID. Consequently, this embodiment can simplify a password to be entered by a user while ensuring security.

In the above embodiments, a password and a user ID are cited as the authentication information. However, information other than these information may be used as the authentication information. For example, the authentication information may include a plurality of pieces of biometric information. Examples of the biometric information include retinal patterns, fingerprints, and voiceprints. For example, the information processing apparatus according to the present invention may simplify the authentication information, for example, by reducing the number of pieces of biometric information to be input by a user, or by reducing biometric information types to be input by a user. The authentication information may include images, icons, symbols, or codes indicating signs.

REFERENCE SIGNS LIST 1 authentication device
2 user terminal
3 user information DB
11 communication unit
12 storage unit
13 input unit
14 display unit
15 input/output interface
16 system controller
16a CPU
16b ROM
16c RAM
17 system bus
161 current user situation identification unit
162 past user situation obtaining unit
163 simplification unit
164 password entry screen output unit
165 authentication unit
NW network
S1, S2 information processing system

The invention claimed is:

1. An information processing apparatus comprising:
at least one memory configured to store computer program instructions; and
at least one processor configured to access said memory, read said program instructions, and operate according to said program instructions, said program instructions including:
first output instructions configured to cause at least one of said at least one processor to output, at a time of authentication for beginning a login session, first information prompting a user to input authentication information identical to original authentication information, stored in storage, of the user;
authentication instructions configured to cause at least one of said at least one processor to begin the login session, when authentication requirements including that authentication information input by the user in response to the output first information is identical to the stored original authentication information are met;
identifying instructions configured to cause at least one of said at least one processor to identify, when reauthentication is required during the login session, a current situation in which the user is placed;
obtaining instructions configured to cause at least one of said at least one processor to obtain a past situation in which the user was placed at a time of the authentication for beginning the login session or past reauthentication during the login session;
simplification instructions configured to cause at least one of said at least one processor to:
set situation difference levels corresponding to a difference between the current and past situation wherein each level is associated with a simplicity value corresponding to how much the authentication information required to be input by the user is simplified, such that simplicity values decrease as the situation difference level increases and simplicity values increase when the current and past situation agree; and
simplify authentication information required to be input by the user wherein, when the current and past situations are different more than once repeatedly in a consecutive manner, less of an increase in situation difference level is required in order to cause the simplicity value to decrease;
second output instructions configured to cause at least one of said at least one processor to output, when the reauthentication is required during the login session, second information prompting the user to input the simplified authentication information.

2. The information processing apparatus according to claim 1,
wherein the obtaining instructions, the identifying instructions, the simplification instructions; and the second output instructions operate every time the re-authentication is required during the login session, and
the simplification instructions are configured to cause at least one of said at least one processor to further simplify the authentication information required to be input by the user to a simplicity lower than a previous simplicity, when the current and past actuations agree consecutively more than once.

3. The information processing apparatus according to claim 1, wherein
when the current and past situations are different, for a first time, the simplicity value is decreased and the authentication information required to be input is simplified less when a difference between the current and past situation is greater.

4. The information processing apparatus according to claim 1, wherein
wherein the obtaining instructions, the identifying instructions, the simplification instructions, and the second output instructions operate every time the reauthentication is required during the login session.

5. The information processing apparatus according to claim 1, wherein
the simplification instructions are configured to cause at least one of said at least one processor to not simplify the authentication information, when the current situation does not meet predetermined requirements for security.

6. The information processing apparatus according to claim 1, wherein
the simplification instructions are configured to cause at least one of said at least one processor to change, depending on the current and past situations, which part of the original authentication information the user is prompted to input as the simplified authentication information.

7. The information processing apparatus according to claim 6, wherein,
when the original authentication information includes a plurality of code types of codes, the simplification instructions cause at least one of said at least one processor to change which type(s) of code(s) in the original authentication information the user is prompted input as the simplified authentication information, depending on a difference between the current and past situations.

8. The information processing apparatus according to claim 7, wherein,
when the original authentication information includes a plurality of code types of codes, the simplification instructions cause at least one of said at least one processor to change how many code types of codes in the original authentication information the user is prompted to input as the simplified authentication information, depending on a difference between the current and past situations.

9. The information processing apparatus according to claim 6, wherein,
when the original authentication information includes a plurality of codes, the simplification instructions cause at least one of said at least one processor to change how many codes in the original authentication information the user is prompted to input as the simplified authentication information, depending on a difference between the current and past situations.

10. The information processing apparatus according to claim 1, further comprising:
part obtaining instructions configured to cause at least one of said at least one processor to obtain a part not included in the simplified authentication information from the original authentication information;
authentication information obtaining instructions configured to cause at least one of said at least one processor to obtain authentication information generated by combining authentication information input in response to the output second information with the obtained part; and
determining instructions configured to cause at least one of said at least one processor to determine, for the reauthentication, whether authentication of the user succeeds or fails, by comparing the obtained authentication information with the original authentication information.

11. The information processing apparatus according to claim 1, further comprising:
position identification instructions configured to cause at least one of said at least one processor to identify a position of a part, determined as the simplified authentication information, of the original authentication information; and
determining instructions configured to cause at least one of said at least one processor to determine, for the reauthentication, whether authentication of the user succeeds or fails, by comparing authentication information input in response to the output second information with the part at the identified position in the original authentication information.

12. The information processing apparatus according to claim 1, wherein
the second output instructions cause at least one of said at least one processor to output a predetermined symbol for a part included in the original authentication information but not included in the simplified authentication information.

13. The information processing apparatus according to claim 1, wherein
the second output instructions cause at least one of said at least one processor to output third information prompting the user to input whole original authentication information of the user, when the reauthentication using authentication information input in response to the output second information has failed.

14. The information processing apparatus according to claim 1, wherein
the simplification instructions cause at least one of said at least one processor to simplify, as the authentication information to be input by the user, identification information of the user, and
the second output instructions cause at least one of said at least one processor to output the second information prompting the user to input the simplified identification information.

15. An information processing method performed by a computer, the method comprising:
outputting, at a time of authentication for beginning a login session, first information prompting a user to input authentication information identical to original authentication information, stored in storage, of the user;

beginning the login session, when authentication requirements including that authentication information input by the user in response to the outputted first information is identical to the stored original authentication information are met;

identifying, when reauthentication is required during the login session, a current situation in which the user is placed;

obtaining a past situation in which the user was placed at a time of the authentication for beginning the login session or past reauthentication during the login session;

setting situation difference level corresponding to a difference between the current and past situation wherein each level is associated with a simplicity value corresponding to how much the authentication information required to be input by the user is simplified, such that simplicity values decrease as the situation difference level increases and simplicity values increase when the current and past situation agree; and simplifying authentication information required to be input by the user, wherein when the current and past situation are different more than once repeatedly in a consecutive manner, less of an increase in situation difference level is required in order to cause the simplicity value to decrease; and outputting, at a time of the reauthentication during the login session, second information prompting the user to input the simplified authentication information.

16. A non-transitory computer readable medium storing thereon an information processing program, the information processing program causing a computer to:

output, at a time of authentication for beginning a login session, first information prompting a user to input authentication information identical to original authentication information, stored in storage, of the user;

beginning the login session, when authentication requirements including that authentication information input by the user in response to the outputted first information is identical to the stored original authentication information are met;

identify, when reauthentication is required during the login session, a current situation in which the user is placed;

obtain a past situation in which the user was placed at a time of the authentication for beginning the login session or past reauthentication during the login session;

set situation difference levels corresponding to a difference between the current and past situation wherein each level is associated with a simplicity value corresponding to how much the authentication information required to be input by the user is simplified, such that simplicity values decrease as the situation difference level increases and simplicity values increase when the current and past situation agree; and simplify authentication information required to be input by the user, wherein when the current and past situations are different more than once repeatedly in a consecutive manner, less of an increase in situation difference level is required in order to cause the simplicity value to decrease; and output, at a time of the reauthentication during the login session, second information prompting the user to input the simplified authentication information.

* * * * *